US008019597B2

(12) United States Patent
Oshikiri

(10) Patent No.: US 8,019,597 B2
(45) Date of Patent: Sep. 13, 2011

(54) SCALABLE ENCODING APPARATUS, SCALABLE DECODING APPARATUS, AND METHODS THEREOF

(75) Inventor: Masahiro Oshikiri, Kanagawa (JP)

(73) Assignee: Panasonic Corporation, Osaka (JP)

( * ) Notice: Subject to any disclaimer, the term of this patent is extended or adjusted under 35 U.S.C. 154(b) by 1134 days.

(21) Appl. No.: 11/577,816

(22) PCT Filed: Oct. 26, 2005

(86) PCT No.: PCT/JP2005/019661
§ 371 (c)(1),
(2), (4) Date: Apr. 24, 2007

(87) PCT Pub. No.: WO2006/046587
PCT Pub. Date: May 4, 2006

(65) Prior Publication Data
US 2009/0125300 A1 May 14, 2009

(51) Int. Cl.

| | |
|---|---|
| ***G06F 15/00*** | (2006.01) |
| ***G10L 11/00*** | (2006.01) |
| ***G10L 19/00*** | (2006.01) |
| ***G10L 21/00*** | (2006.01) |
| ***G10L 11/04*** | (2006.01) |
| ***G10L 19/14*** | (2006.01) |
| ***G10L 19/06*** | (2006.01) |
| ***G10L 21/02*** | (2006.01) |

(52) U.S. Cl. ..................... 704/205; 704/200; 704/200.1; 704/207; 704/209; 704/220; 704/227; 704/230

(58) Field of Classification Search .................. 704/200, 704/200.1, 205, 207, 209, 220, 227, 230
See application file for complete search history.

(56) References Cited

U.S. PATENT DOCUMENTS

| | | | | |
|---|---|---|---|---|
| 4,809,334 | A * | 2/1989 | Bhaskar | 704/207 |
| 5,617,507 | A * | 4/1997 | Lee et al. | 704/200 |
| 5,765,127 | A * | 6/1998 | Nishiguchi et al. | 704/208 |
| 5,806,024 | A * | 9/1998 | Ozawa | 704/222 |
| 5,832,437 | A * | 11/1998 | Nishiguchi et al. | 704/268 |
| 5,930,747 | A * | 7/1999 | Iijima et al. | 704/207 |
| 6,064,962 | A * | 5/2000 | Oshikiri et al. | 704/262 |

(Continued)

FOREIGN PATENT DOCUMENTS

EP 1351401 10/2003

(Continued)

OTHER PUBLICATIONS

Hassanein H; Brind'Amour A; Bryden K; "A hybrid multiband excitation coder for low bit rates", Wireless Communications, 1992. Conference Proceedings, IEEE International Conference on Selected Topics in Vancouver, BC, Canada, Jun. 25-26, 1992.

(Continued)

*Primary Examiner* — E. Yen
(74) *Attorney, Agent, or Firm* — Greenblum & Bernstein, P.L.C.

(57) ABSTRACT

A scalable encoding apparatus capable of reducing the bit rates of encoded parameters and also capable of efficiently encoding audio signals in which a plurality of harmonic structures are coexistent. In the apparatus, an MDCT analyzer MDCT analyzes an audio signal for converting/encoding processes. A pitch frequency converter determines an inverse of a pitch period to calculate a pitch frequency. A selector selects spectra located at frequencies that are integral multiples of the pitch frequency, and a second layer encoder encodes the selected spectra.

19 Claims, 22 Drawing Sheets

U.S. PATENT DOCUMENTS

| | | | | |
|---|---|---|---|---|
| 6,208,957 | B1 | 3/2001 | Nomura | |
| 6,298,322 | B1 * | 10/2001 | Lindemann | 704/222 |
| 6,345,246 | B1 * | 2/2002 | Moriya et al. | 704/219 |
| 6,377,915 | B1 * | 4/2002 | Sasaki | 704/206 |
| 6,584,437 | B2 * | 6/2003 | Heikkinen et al. | 704/207 |
| 6,606,592 | B1 * | 8/2003 | Cho et al. | 704/219 |
| 6,633,839 | B2 * | 10/2003 | Kushner et al. | 704/205 |
| 7,191,128 | B2 * | 3/2007 | Sall et al. | 704/233 |
| 7,315,819 | B2 * | 1/2008 | Toguri et al. | 704/246 |
| 2001/0000190 | A1 * | 4/2001 | Oshikiri et al. | 704/233 |
| 2001/0023396 | A1 * | 9/2001 | Gersho et al. | 704/220 |
| 2002/0138268 | A1 | 9/2002 | Gustafsson | |
| 2003/0036905 | A1 * | 2/2003 | Toguri et al. | 704/250 |
| 2003/0182105 | A1 * | 9/2003 | Sall et al. | 704/206 |
| 2004/0002854 | A1 | 1/2004 | Ha | |
| 2004/0028244 | A1 | 2/2004 | Tsushima et al. | |
| 2004/0068407 | A1 | 4/2004 | Serizawa | |
| 2004/0133422 | A1 * | 7/2004 | Darroudi et al. | 704/220 |
| 2004/0247037 | A1 | 12/2004 | Honma et al. | |
| 2005/0163323 | A1 | 7/2005 | Oshikiri | |

FOREIGN PATENT DOCUMENTS

| | | |
|---|---|---|
| FR | 2796189 | 1/2001 |
| JP | 6-085607 | 3/1994 |
| JP | 9-055778 | 2/1997 |
| JP | 9-55778 | 2/1997 |
| JP | 9-181611 | 7/1997 |
| JP | 11-30997 | 2/1999 |
| JP | 2002-229599 | 8/2002 |
| JP | 2003-323199 | 11/2003 |
| JP | 2004-053940 | 2/2004 |
| JP | 2004-80635 | 3/2004 |
| JP | 2004-080635 | 3/2004 |
| JP | 2004-517368 | 6/2004 |
| WO | 03/063135 | 7/2003 |

OTHER PUBLICATIONS

Almeida et al., "Harmonic Coding: A Low Bit-Rate, Good-Quality Speech Coding Technique," Proceedings of ICASSP 82, IEEE International Conference on Acoustics, Speech and Signal Processing, IEEE, New York, NY, USA, 1982, pp. 1664-1667, XP002467538.

Oshikiri et al., "Efficient spectrum coding for super-wideband speech and its application to 7/10/15 KHz bandwidth scalable coders," Acoustics, Speech and Signal Processing, 2004, Proceedings, (ICASSP'04), IEEE International Conference on Montreal, Quebec, Canada, May 17-21, 2004, Piscataway, NJ, USA, IEEE, vol. 1, May 17, 2004, pp. 481-484, XP010717670.

Oshikiri et al., "A scalable coder designed for 10-KHz bandwidth speech," Speech Coding 2002, IEEE Workshop Proceedings, Oct. 6-9, 2002, Piscataway, NY USA, IEEE, Oct. 6, 2002, pp. 111-113, XP010647230.

English language Abstract of WO 01/03121.

English language Abstract of JP 9-181611.

"All about MPEG-4," edited by S. Miki, First Edition, Japan Industrial Standards Committee, Sep. 30, 1998, pp. 126-127 (in Japanese), together with an English language translation of the same.

U.S. Appl. No. 11/576,264 to Goto et al., which was filed Mar. 29, 2007.

U.S. Appl. No. 11/576,659 to Oshikiri, which was filed Apr. 4, 2007.

U.S. Appl. No. 11/718,437 to Ehara et al., which was filed May 2, 2007.

Japan Patent Office (JPO) Office Action, mailed Jul. 12, 2011, in the corresponding Japanese Patent Application.

* cited by examiner

SCALABLE ENCODING APPARATUS, SCALABLE DECODING APPARATUS, AND METHODS THEREOF

TECHNICAL FIELD

The present invention relates to a scalable coding apparatus, scalable decoding apparatus and method for these apparatuses for performing transform coding in upper layer.

BACKGROUND ART

In mobile communication systems, for effective use of radio wave resources and the like, it is required to compress a speech signal at a low bit rate upon transmission. Meanwhile, since users have demanded improvements in quality of telephone speech and achievement of telephone service with a high fidelity, required is not only high quality of speech signals, but also high-quality coding of signals with a wider band such as audio signals and the like.

For two thus mutually contradictory requirements, a potential technique is to integrate a plurality of coding techniques hierarchically. This technique hierarchically combines a first layer for encoding an input signal at a low bit rate using a model suitable for speech signals, and a second layer for encoding a differential signal between the input signal and a decoded signal of the first layer using a model suitable for signals other than speech signals. Such a technique that performs layered coding has scalability for a bit stream obtained from a coding apparatus i.e. has a property of being able to obtain a decoded signal from information about part of a bit stream, and is generally called scalable coding. This scalable coding is capable of flexibly supporting communication between networks with different bit rates. Accordingly, scalable coding is regarded as being suitable for the future network environment where various networks will be integrated using the IP protocol. As an example for implementing scalable coding using techniques standardized by MPEG-4 (Moving Picture Experts Group phase-4), for example, there is a technique as disclosed in Non-patent Document 1. This technique uses CELP coding (Code Excited Liner Prediction) coding suitable for speech signals in the first layer, and in the second layer, uses transform coding such as AAC (Advanced Audio Coder), Twin VQ (Transform Domain Weighted Interleave Vector Quantization) and the like for a residual signal obtained by subtracting a first layer decoded signal from an original signal. This transform coding is a technique for transforming a signal in the time domain into a signal in the frequency domain and encoding the signal in the frequency domain.

Further, as a specific example of transform coding, there is a technique as disclosed in Patent Document 1. In this technique, an input signal is subjected to pitch analysis to obtain a pitch frequency, and spectra positioned at frequencies of integral multiples of the pitch frequency are collectively encoded. Herein, when it is assumed that a frequency of an integral multiple of the pitch frequency that is a parameter for specifying a harmonic structure of a speech signal is called a harmonic frequency, and that a spectrum positioned at the harmonic frequency is called a harmonic spectrum, the technique of Patent Document 1 is to decode a harmonic spectrum, subtract the decoded spectrum from an input spectrum to obtain an error spectrum, and separately encode the error spectrum. According to this configuration, it is possible to efficiently encode the harmonic spectrum with a relatively small amount of computations, and to provide a coding scheme with little degradation of speech quality.

Patent Document 1: Japanese Patent Application Laid-Open No. H09-181611

Non-patent Document 1: "All about MPEG-4", written and edited by Sukeichi Miki, first print, Kogyo Cyosakai Publishing, Inc. Sep. 30, 1998, p 126-127

DISCLOSURE OF INVENTION

Problems to be Solved by the Invention

However, in case the technique of Patent Document 1 is applied to scalable coding, it is necessary to encode a pitch frequency and transmit the result to the decoding side so as to specify the harmonic frequency. Further, it is necessary to obtain an error spectrum after the harmonic spectrum is decoded and further encode the error spectrum. Consequently, the encoded parameters have increased bit rates.

Further, the technique of Patent Document 1 presumes a case where there is only one set of harmonic spectra for one pitch frequency (i.e. a case where there is only one kind of excitation), and, when an input signal includes a plurality of kinds of excitations such as from a plurality of speakers and musical instruments, high-quality coding is made difficult. This is because, when a plurality of excitations exist, a plurality of kinds of harmonic spectra that are specified by different pitch frequencies—namely, a primary harmonic spectrum (main harmonic spectrum) and a secondary harmonic spectrum (sub-harmonic spectrum)—are mixed.

It is therefore an object of the invention to provide a scalable coding apparatus, scalable decoding apparatus and a methods for these apparatuses, capable of decreasing the bit rate of encoded parameters and efficiently encoding a speech signal having a plurality of harmonic structures.

Means for Solving the Problem

A scalable coding apparatus of the invention adopts a configuration having: a first coding section that encodes a speech signal using a pitch period of the speech signal; a calculation section that calculates a pitch frequency from the pitch period; and a second coding section that encodes a spectrum of a frequency of an integral multiple of the pitch frequency in spectra of the speech signal.

ADVANTAGEOUS EFFECT OF THE INVENTION

The present invention can reduce the bit rate of encoded parameters in scalable coding. Furthermore, with the present invention, the coding side is capable of efficiently encoding a speech signal having a plurality of harmonic structures, while the decoding side is capable of improving speech quality of the decoded speech signal.

BEST MODE FOR CARRYING OUT THE INVENTION

Embodiments of the invention will specifically be described below with reference to the accompanying drawings.

Embodiment 1

Figure 1:
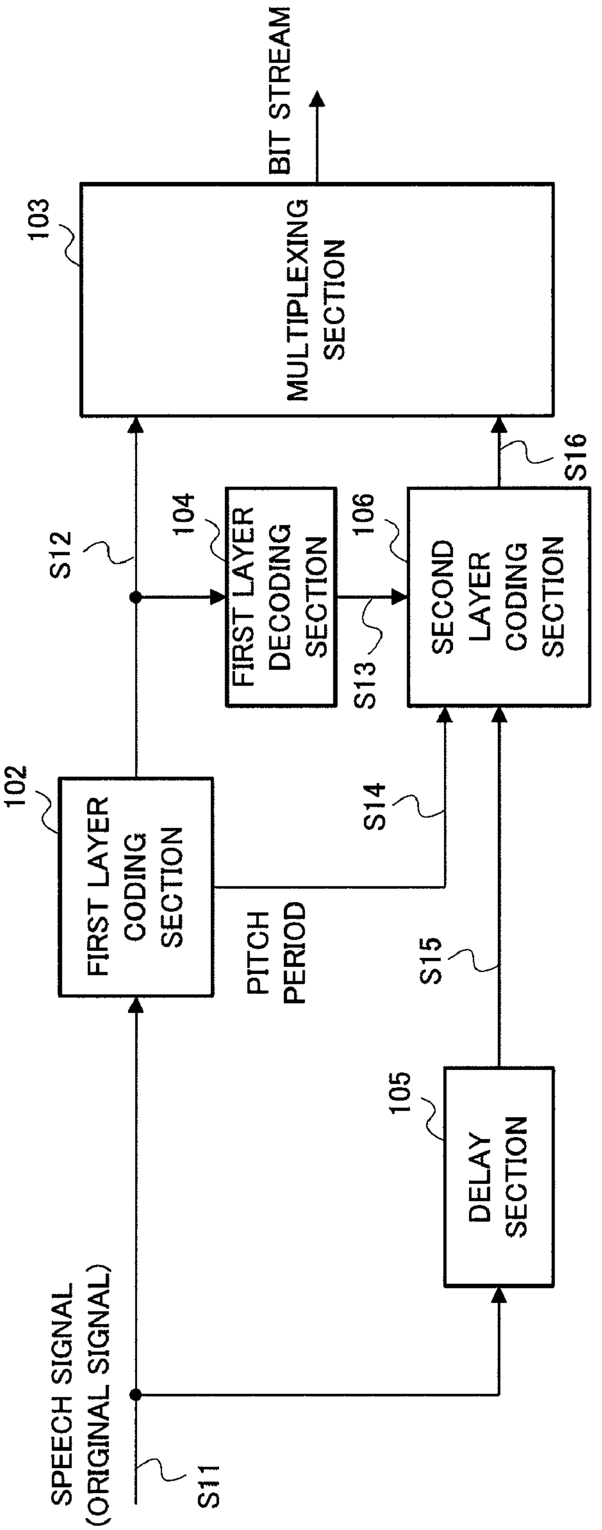
FIG. 1 is a block diagram showing a primary configuration of a scalable coding apparatus according to Embodiment 1.

FIG. 1 is a block diagram showing a primary configuration of a scalable coding apparatus according to Embodiment 1.

Sections in the scalable coding apparatus according to this embodiment perform the following operations.

First layer coding section 102 encodes an input speech signal (i.e. original signal) S11 by the CELP scheme, and sends the obtained, encoded parameters S12 to multiplexing section 103 and first layer decoding section 104. First layer coding section 102 outputs the pitch period S14 among the obtained encoded parameters, to second layer coding section 106. For the pitch period, the adaptive codebook lag obtained in adaptive codebook search is used. First layer decoding section 104 generates a first layer decoded signal S13 from the encoded parameters S12 outputted from first layer coding section 102, and outputs the signal to second coding section 106.

Meanwhile, delay section 105 provides the input speech signal S11 with a predetermined length of delay. The delay is to compensate for the time delays occurring in first layer coding section 102, first layer decoding section 104, etc. Using the first layer decoded signal S13 generated in first layer decoding section 104, second layer coding section 106 performs transform coding on a speech signal S15 outputted from delay section 105 with a predetermined time of delay, using MDCT (Modified Discrete Cosine Transform), and outputs generated encoded parameters S16 to multiplexing section 103.

Multiplexing section 103 multiplexes the encoded parameters S12 obtained in first layer coding section 102 and the encoded parameters S16 obtained in second layer coding section 106, and outputs the result to outside as a bit stream of the output encoded parameters.

Figure 2:
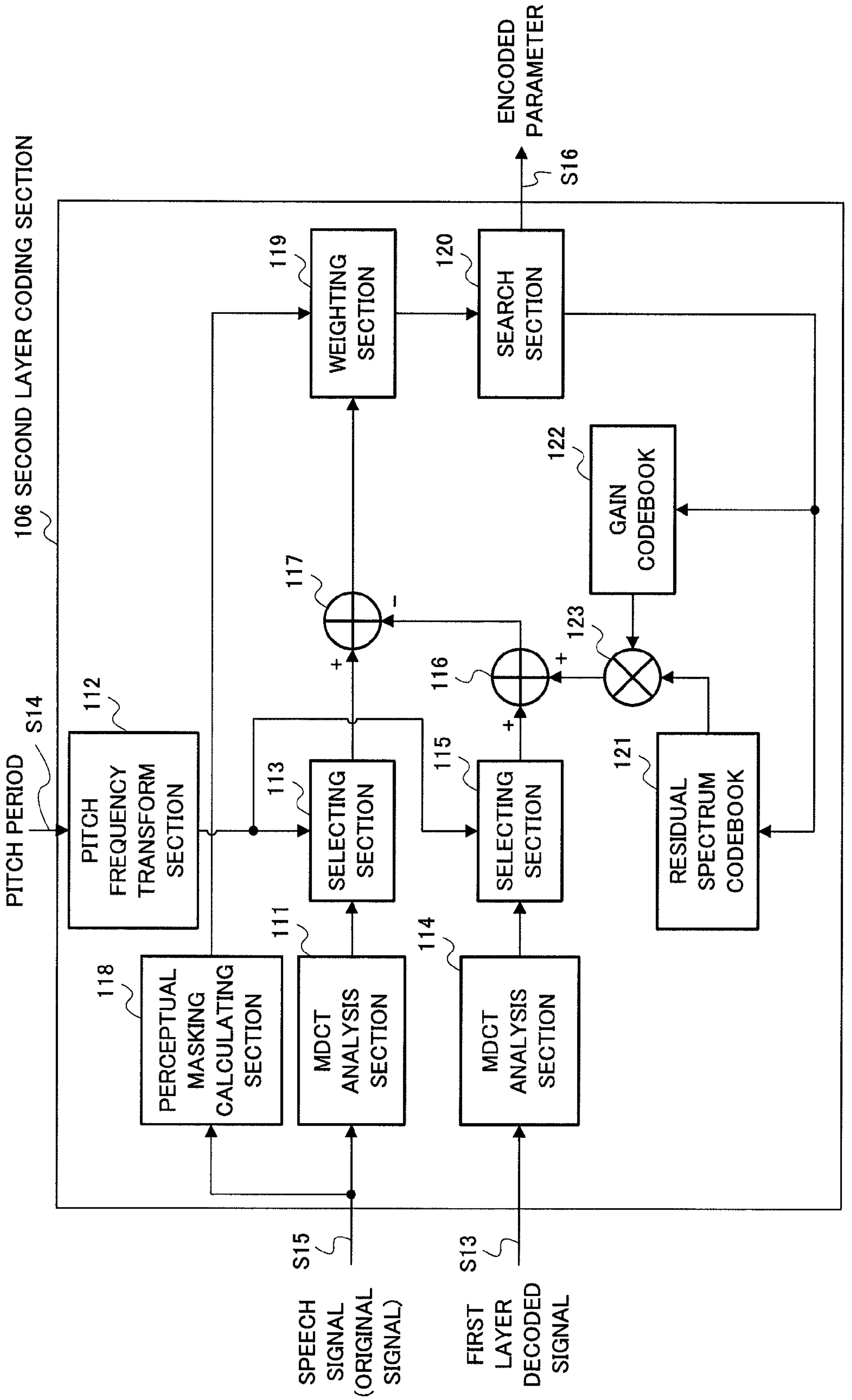
FIG. 2 is a block diagram showing a primary configuration inside a second layer coding section according to Embodiment 1.

FIG. 2 is a block diagram showing a primary configuration inside second layer coding section 106 as described above.

MDCT analysis section 111 performs MDCT analysis on the speech signal S15 to perform transform coding, and outputs the spectrum of the analysis result to selecting section 113. Transform coding is a technique for transforming a time domain signal into a frequency domain signal and encoding the frequency domain signal. As transform coding using MDCT analysis, there are AAC (Advanced Audio Coder), Twin VQ (Transform Domain Weighted Interleave Vector Quantization) and so on.

Pitch frequency transform section 112 transforms the pitch period S14 outputted from first layer coding section 102 into a value of the second, and then obtains the reciprocal of the value and calculates the pitch frequency, and outputs the pitch frequency to selecting sections 113 and 115.

Using the pitch frequency outputted from pitch frequency transform section 112, selecting section 113 selects part of the spectra of the speech signal outputted from MDCT analysis section 111 and outputs them to adding section 117. More specifically, selecting section 113 selects the spectra (harmonic spectra) positioned at the frequencies (harmonic frequencies) of integral multiples of the pitch frequency, and outputs these spectra to adding section 117. Second layer coding section 106 performs coding processing as described below on a plurality of selected harmonic spectra. Thus, by making a limited range of spectra subject to coding, instead of the entire range of spectra, it is possible to set the coding rate at a lower bit rate. In addition, herein, a harmonic spectrum refers to a spectrum of an extremely narrow band, like a line spectrum, positioned at a harmonic frequency.

As in MDCT analysis section 111, MDCT analysis section 114 performs MDCT analysis on the first layer decoded signal S13 outputted from first layer decoding section 104, and outputs the spectrum of the analysis result to selecting section 115.

As in selecting section 113, using the pitch frequency outputted from pitch frequency transform section 112, selecting section 115 selects spectra in a limited range among the spectra of the first layer decoded signal outputted from MDCT analysis section 114 and outputs them to adding section 116.

Residual spectrum codebook 121 generates a residual spectrum corresponding to an index instructed from search section 120 (described later) and outputs it to multiplier 123.

Gain codebook 122 outputs a gain corresponding to an index instructed from search section 120 (described later), to multiplier 123.

Multiplier 123 multiplies the residual spectrum generated in residual spectrum codebook 121 by the gain outputted from gain codebook 122, and outputs the gain-adjusted residual spectrum to adder 116.

Adder 116 adds the gain-adjusted residual spectrum outputted from multiplier 123 to the spectra of the first layer decoded signal of a limited range outputted from selecting section 115, and outputs the result to adder 117.

Adder 117 subtracts the spectrum of the first layer decoded signal outputted from adder 116 from the spectra of the speech signal in a limited range outputted from selecting section 113 to obtain a residual spectrum, and outputs the residual spectrum to weighting section 119. Second layer coding section 106 performs coding to minimize this residual spectrum.

Perceptual masking calculating section 118 calculates a threshold of noise power that is not perceived by the human (i.e. perceptual masking) and outputs the threshold to weighting section 119. Human perception has a characteristic (masking effect) that, when a signal of a certain frequency is given, signals at frequencies near the frequency become hard to hear. Perceptual masking calculating section 118 calculates perceptual masking from the spectrum of the input speech signal S15, utilizing this characteristic in second layer coding section 106.

Weighting section 119 performs weighting on the residual spectrum outputted from adder 117 using the perceptual masking calculated in perceptual masking calculating section 118 to output to search section 120.

The above-mentioned residual spectrum codebook 121, gain codebook 122, multiplier 123, adders 116, 117, and weighting section 119 constitute a closed loop (feedback loop), and search section 120 changes indexes to indicate to residual spectrum codebook 121 and gain codebook 122, so as to minimize the residual spectrum outputted from weighting section 119.

More specifically, vector candidates for the residual spectrum stored in residual spectrum codebook 121 and gain candidates stored in gain codebook 122 are determined such that the distortion E expressed by following equation 1 is minimized. w(k) is a weighting function determined by perceptual masking, o(k) is a original signal spectrum, g(j) is the jth gain candidate, e(i,k) is the ith residual spectrum candidate, and b(k) is the base layer spectrum.

[1]

$$E=\sum_k w(k)\cdot(o(k)-(g(j)\cdot e(i,k)+b(k)))^2 \qquad \text{(Equation 1)}$$

Further, when second layer coding section 106 is a coding section using a scale factor, the distortion E is defined as in following equation 2, for example. SF(k) is a decoded scale factor obtained by encoding a scale factor of an original signal spectrum, and b'(k) is a spectrum obtained by normalizing a base layer spectrum using a scale factor thereof.

[2]

$$E=\sum_k w(k)\cdot(o(k)-(g(j)\cdot e(i,k)+SF(k)\cdot b'(k)))^2 \qquad \text{(Equation 2)}$$

Search section 120 outputs indexes of residual spectrum codebook 121 and gain codebook 122 that are finally obtained by the above-mentioned loop, to outside the second layer coding section 106 as encoded parameters S16.

Next, how coding efficiency can be improved by the processing of selecting a limited range of spectra in selecting sections 113 and 115 will be described below in detail with reference to the accompanying drawings.

Figure 3:
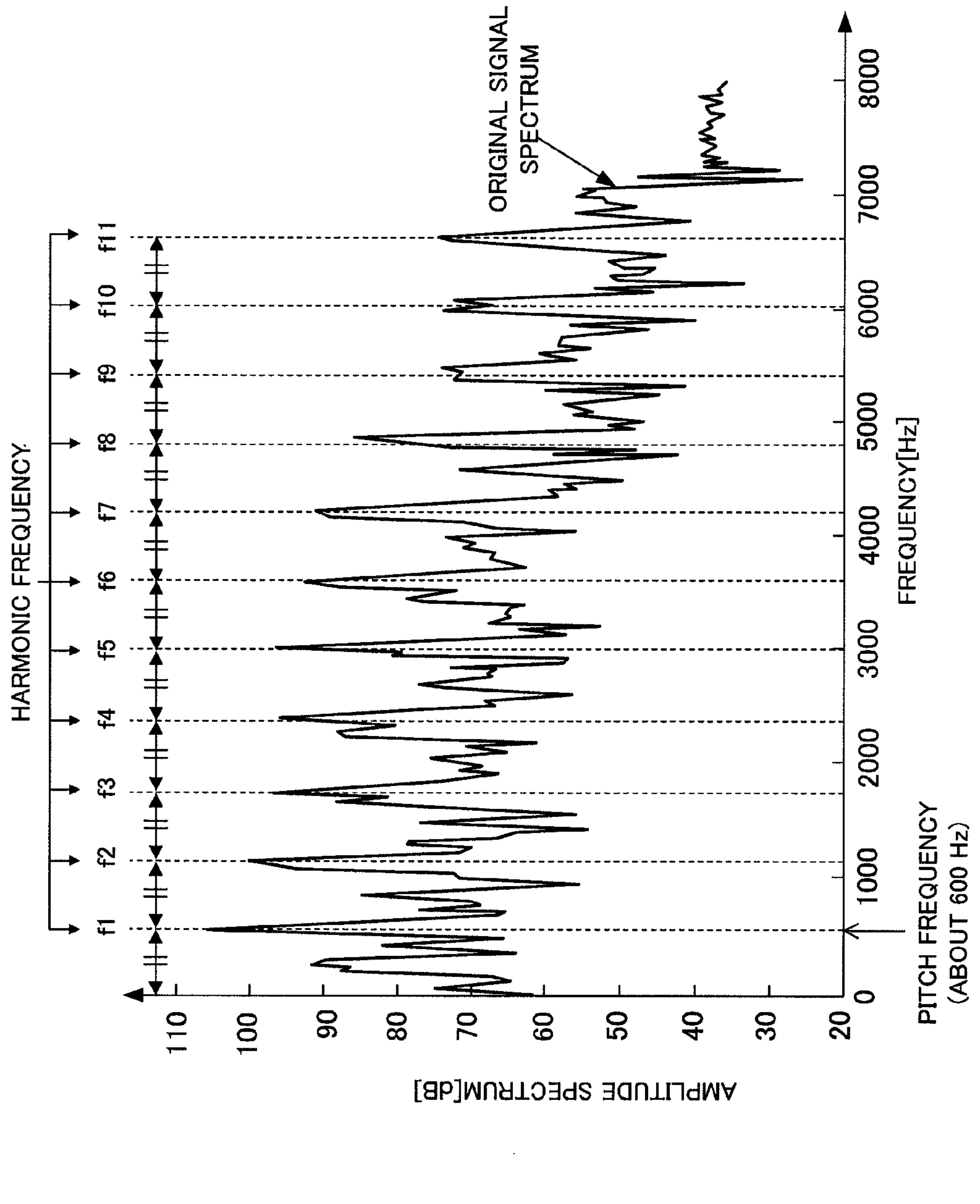
FIG. 3 is a graph showing an example of an audio signal spectrum.

FIG. 3 is a graph showing an example of an audio signal spectrum that is an original signal. The sampling frequency is 16 kHz.

In this example, the pitch frequency is about 600 Hz, and it is understood that, in a typical audio signal, a plurality of spectrum peaks (harmonic spectra) appear at the positions of integral multiples of the pitch frequency (i.e. at the positions of harmonic frequencies f1, f2, f3 . . . ).

Figure 4:
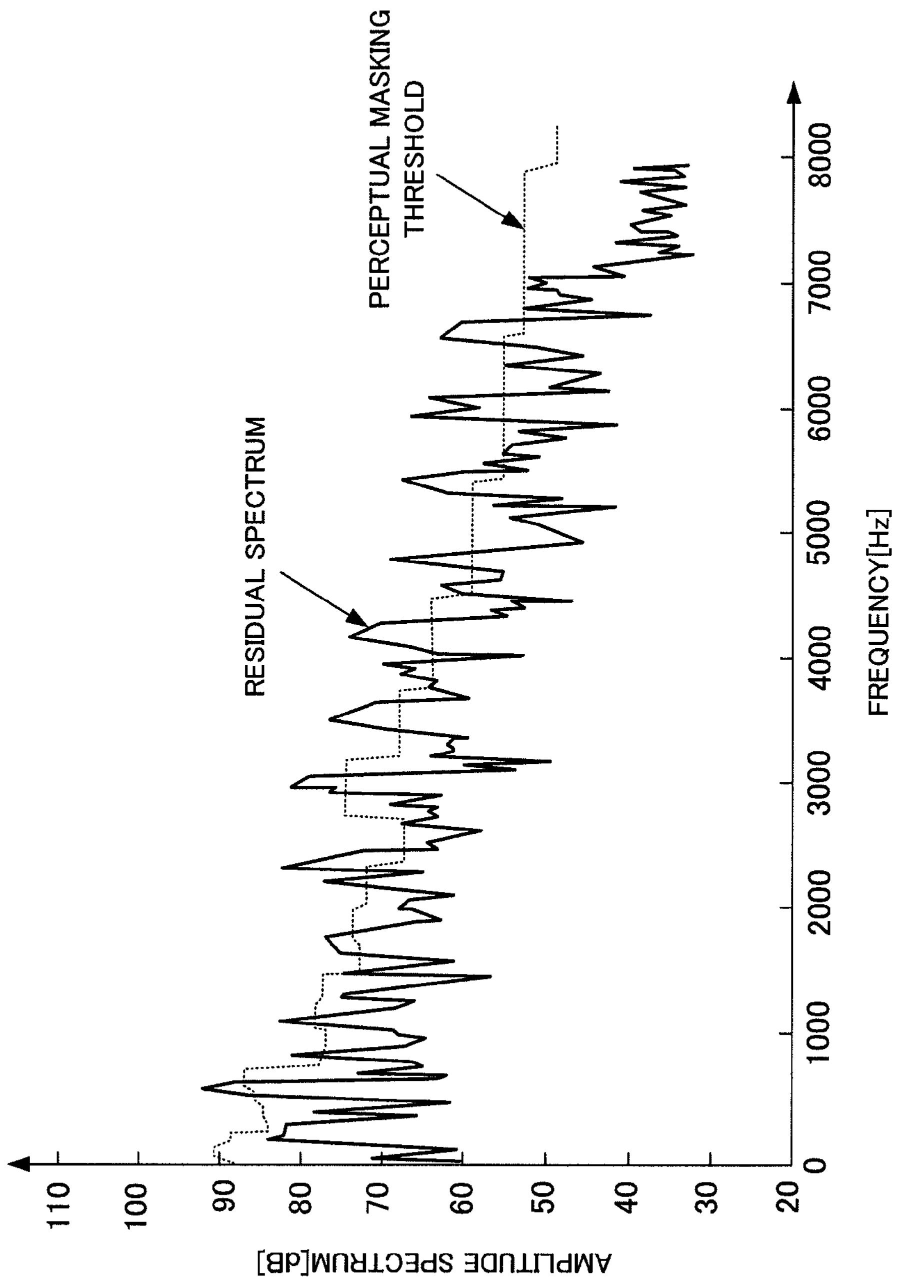
FIG. 4 is a graph showing an example of a residual spectrum.

FIG. 4 is a graph showing an example of a residual spectrum obtained by subtracting the first layer decoded signal from the original signal spectrum as shown in FIG. 3. In this figure, the solid line is the residual spectrum, and the dotted line is the perceptual masking threshold.

As shown in the figure, since coding is performed in the first layer, the residual spectrum has lower amplitudes than the original signal spectrum on the whole. Further, the spectra of lower frequencies have lower amplitudes than the spectra of higher frequencies. This is because of a characteristic that CELP coding performed in first layer coding section 102 provides processing for making less the coding distortion of components of greater signal energy.

In the residual spectrum positioned at the harmonic frequency, the amplitude attenuates as compared with the original signal spectrum, but the shape of the peak still remains. In other words, such a situation frequently occurs that even when the amplitude attenuates, the peak of the residual spectrum exceeds the perceptual masking threshold at the harmonic frequency. Further, by the above-mentioned characteristic of CELP coding, the number of peaks in the residual spectrum exceeding the perceptual masking threshold is greater at higher frequencies than at lower frequencies.

Meanwhile, when the residual spectrum is smaller than the perceptual masking threshold, the coding distortion is not perceived. As described above, the residual spectrum exceeds the perceptual masking threshold mostly at harmonic frequencies or in the vicinities thereof, and this trend is emphasized at higher frequencies. Further, the residual spectrum is mostly smaller than the perceptual masking threshold at frequencies other than the harmonic frequencies, and do not need to be subject to coding.

Therefore, by considering the above-mentioned characteristics, in this embodiment, to perform efficient coding on an input signal, the spectra positioned at harmonic frequencies are subject to coding in the second layer.

Figure 5:
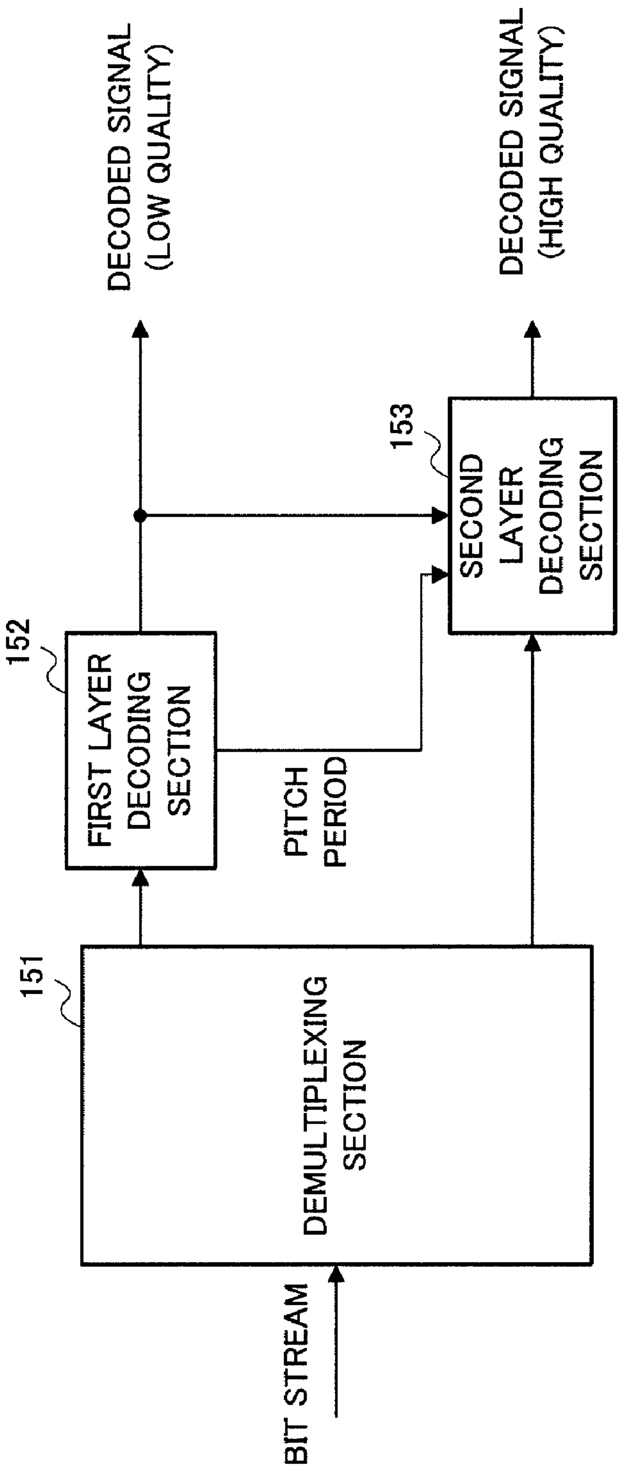
FIG. 5 is a block diagram showing a primary configuration of a scalable decoding apparatus according to Embodiment 1.

FIG. 5 is a block diagram showing a primary configuration of a scalable decoding apparatus according to this embodiment (i.e. an apparatus that decodes a code encoded in the above-mentioned scalable coding apparatus).

Demultiplexing section 151 demultiplexes a code encoded in the above-mentioned scalable coding apparatus into the encoded parameters for first layer decoding section 152 and the encoded parameters for second layer decoding section 153.

First layer decoding section 152 performs CELP-scheme decoding on the encoded parameters obtained in demultiplexing section 151, and outputs the obtained first layer decoded signal to second layer decoding section 153. Further, first layer decoding section 152 outputs the pitch period obtained by the CELP-scheme decoding, to second layer decoding section 153. For the pitch period, the adaptive codebook lag is used. When necessary, the first layer decoded signal is directly outputted to outside as a low quality decoded signal.

Using the first layer decoded signal obtained from first layer decoding section 152, second layer decoding section 153 performs decoding processing (described later) on the second layer encoded parameters demultiplexed in demultiplexing section 151, and outputs the obtained second layer decoded signal to the outside as a high quality decoded signal, when necessary.

In this way, the minimum quality of reproduced speech can be guaranteed by a first layer decoded signal, and the quality of the reproduced speech can be improved by the second layer decoded signal. Further, whether the first layer decoded signal or the second layer decoded signal is outputted depends on whether the second layer encoded parameters can be obtained due to network environment (such as occurrence of packet loss), or on an application or user settings.

Figure 6:
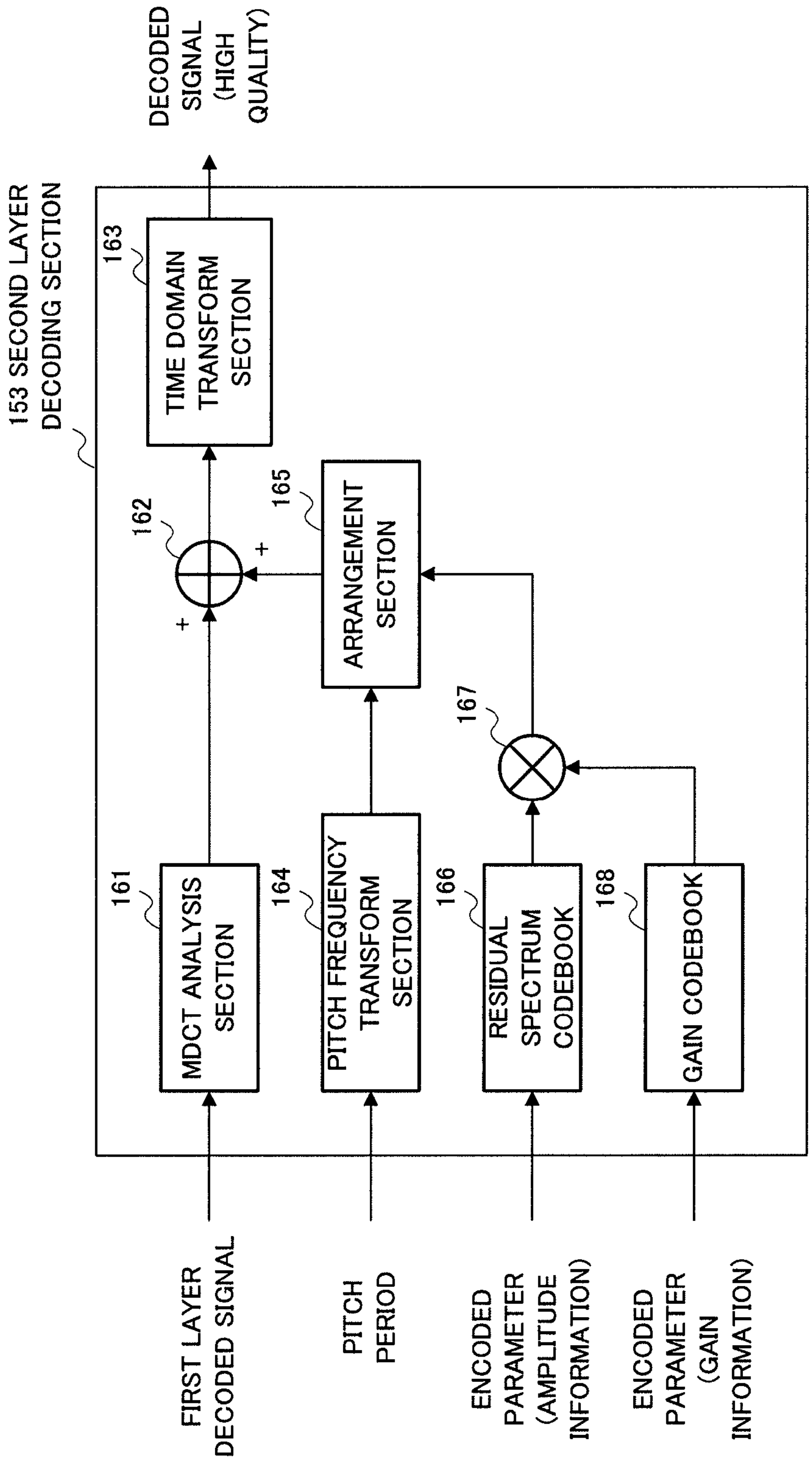
FIG. 6 is a block diagram showing a primary configuration inside a second layer decoding section according to Embodiment 1.

FIG. 6 is a block diagram showing a primary configuration inside above-mentioned second layer decoding section 153.

MDCT analysis section 161, adder 162, pitch frequency transform section 164, residual spectrum codebook 166, multiplier 167 and gain codebook 168 shown in the figure have configurations corresponding to MDCT analysis section 114, adder 116, pitch frequency transform section 112, residual spectrum codebook 121, multiplier 123 and gain codebook 122 of second layer coding section 106 (see FIG. 2) of the above-mentioned scalable coding apparatus, respectively, and these sections basically have the same functions.

Using the encoded parameters (amplitude information) outputted from demultiplexing section 151, residual spectrum codebook 166 selects one residual spectrum from among a plurality of residual spectrum candidates stored therein and outputs that spectrum to multiplier 167.

Using the encoded parameters (gain information) outputted from demultiplexing section 151, gain codebook 168 selects one gain from among a plurality of gain candidates stored therein and outputs the gain to multiplier 167.

Multiplier 167 multiplies the residual spectrum outputted from residual spectrum codebook 166 by the gain outputted from gain codebook 168, and outputs the gain-adjusted residual spectrum to arrangement section 165.

Using the pitch period outputted from first layer decoding section 152, pitch frequency transform section 164 calculates the pitch frequency and outputs the result to arrangement section 165. The pitch frequency is expressed by transforming the pitch period into a value of the second and obtaining the reciprocal of that value.

Arrangement section 165 arranges the gain-adjusted residual spectrum outputted from multiplier 167 at the harmonic frequency determined by the pitch frequency outputted from pitch frequency transform section 164 and outputs the result to adder 162. The method of arranging the residual spectrum depends on how selecting sections 113 and 115 in second layer coding section 106 on the coding side allocate MDCT coefficients using the pitch frequency, and the decoding side employs the same arrangement method as on the coding side.

MDCT analysis section 161 performs frequency analysis on the first layer decoded signal outputted from first layer decoding section 152 by MDCT transform, and outputs the obtained MDCT coefficients (i.e. first layer decoded spectrum) to adder 162.

Adder 162 adds the spectrum with each arranged residual spectrum outputted from arrangement section 165 to the first layer decoded spectrum outputted from MDCT analysis section 161, thereby generating a second layer decoded spectrum and outputting it to time domain transform section 163.

Time-domain transform section 163 transforms the second layer decoded spectrum outputted from adder 162 into a time-domain signal and thereafter performs appropriate processing such as windowing and overlap-addition on the signal where necessary to avoid discontinuity occurring between frames and output an actual high-quality decoded signal.

As described above, according to this embodiment, using the pitch period obtained by CELP-scheme coding in the first layer, harmonic frequencies that specify the harmonic structures of a speech signal are specified in the second layer, and only the spectra of the harmonic frequencies are subject to coding. Accordingly, since the entire frequency band of the speech signal is not subject to coding, it is possible to reduce the bit rate of encoded parameters, and, since the spectra at the harmonic frequencies are spectra that represent the characteristics of the speech signal well, it is possible to obtain a high quality decoded signal at a low bit rate, and coding efficiency is good. Further, it is not necessary to transmit additional information about the pitch frequency to the decoding side.

In addition, although a case has been described with this embodiment where the harmonic spectra (i.e. the spectra of harmonic frequencies) are subject to coding, in transform coding in the second layer, it is not necessary to limit the spectra subject to coding to the spectra of harmonic frequencies. For example, a coding target may be obtained by selecting the spectrum having a sharper peak shape than other spectra from the spectra positioned near a harmonic frequency. In this case, it is necessary to encode and transmit to the decoding section information about the relative position of the selected spectrum with respect to the harmonic frequency.

In addition, although a case has been described with this embodiment where harmonic spectra (i.e. extremely narrow band spectra like line spectra, positioned at harmonic frequencies) are subject to coding in transform coding in the second layer, the spectra subject to coding do not need to be a spectrum like line spectra. For example, a coding target may be a spectrum having a predetermined bandwidth (narrow band) near a harmonic frequency. For this predetermined bandwidth, for example, it is possible to set a predetermined range in the frequency domain centering around a harmonic frequency.

Figure 7:
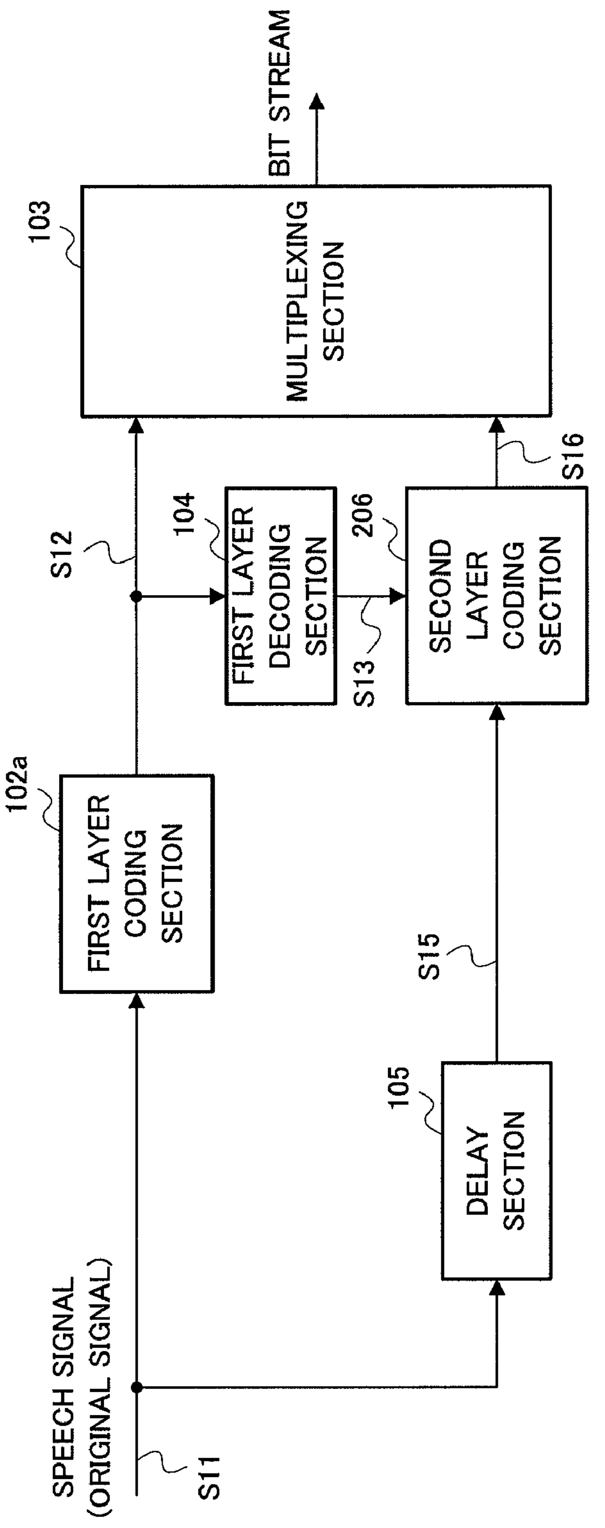
FIG. 7 is a block diagram showing a primary configuration of modified example 1 of the scalable coding apparatus according to Embodiment 1.

FIG. 7 is a block diagram showing a primary configuration of modified example 1 of the scalable coding apparatus according to this embodiment. In addition, the same components as the components described above are assigned the same reference numerals, and descriptions thereof are omitted.

The basic operation of first layer coding section **102*a* is the same as that of first layer coding section 102, but differs innot outputting a pitch period to second layer coding section 206. Second layer coding section 206 performs correlation analysis on the first layer decoded signal S13 outputted from first layer decoding section 104** to obtain a pitch period.

Figure 8:
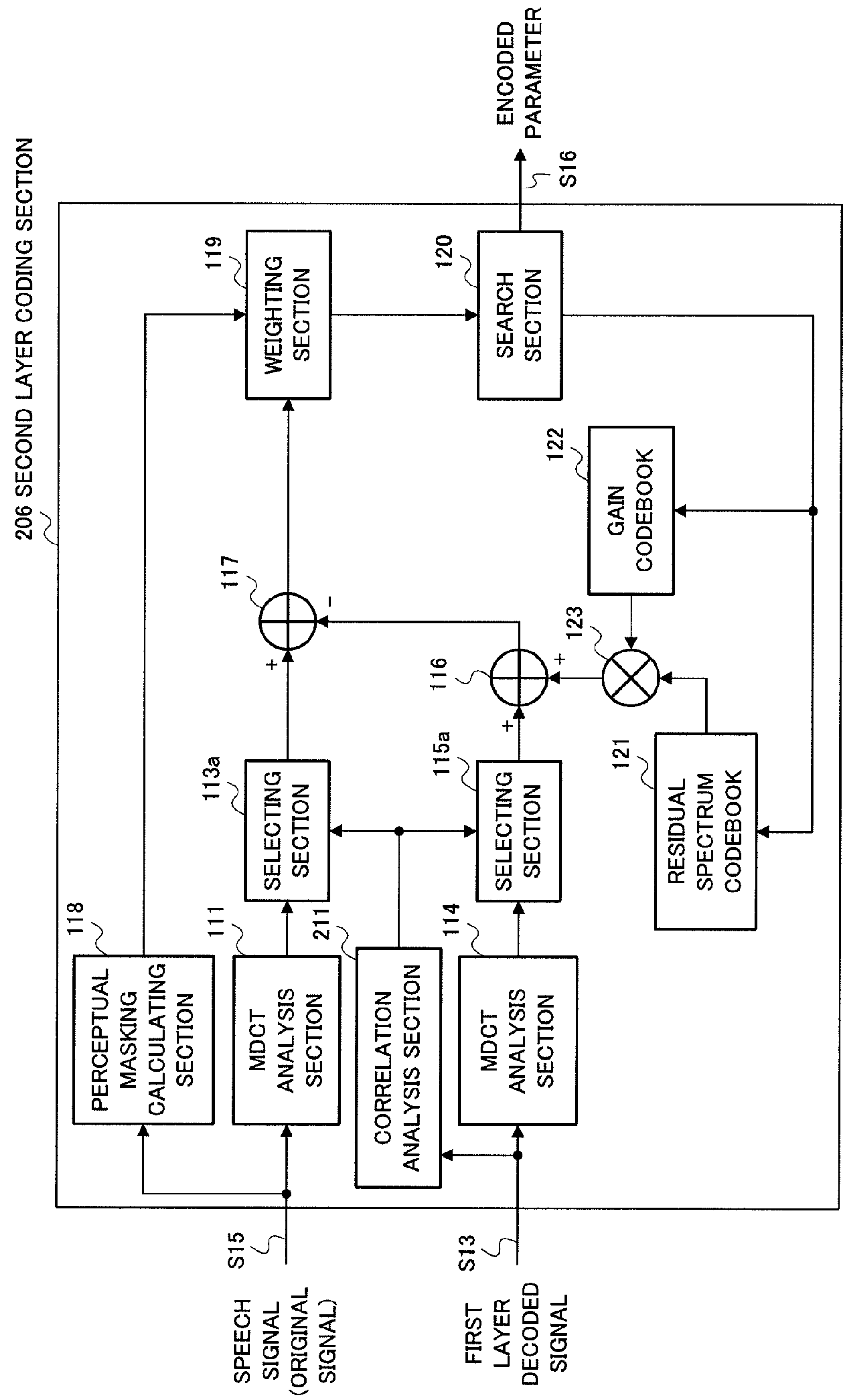
FIG. 8 is a block diagram showing a primary configuration of the second layer coding section according to Embodiment 1.

FIG. 8 is a block diagram showing a primary configuration inside above-mentioned second layer coding section 206. In addition, the same components as components described already are assigned the same reference numerals, and descriptions thereof are omitted.

The correlation analysis in correlation analysis section 211 is performed, for example, according to following equation 3, when the first layer decoded signal is y(n). Herein, $\tau$ is a candidate of the pitch period, outputted when it maximizes Cor($\tau$) in the search range from TMIN to TMAX.
[3]

$$Cor(\tau) = \frac{\sum_n y(n) \cdot y(n-\tau)}{\sqrt{\sum_n y(n-\tau)^2}} \quad TMIN \le \tau \le TMAX \qquad \text{(Equation 3)}$$

The pitch period obtained in first layer coding section 102*a* is determined in the processing for minimizing the distortion between the adaptive vector candidate contained in the internal adaptive codebook and the original signal, and sometimes the correct pitch period is not obtained depending on adaptive vector candidates contained in the adaptive codebook and instead a pitch period of an integral multiple or an integral submultiple of the correct pitch period is obtained. However, first layer coding section 102*a* also has a random codebook to encode an error component that cannot be represented by the adaptive codebook, and, even when the adaptive codebook does not function effectively, encoded parameters are generated using the random codebook. Therefore, the first layer decoded signal obtained by encoding the encoded parameters is closer to the original signal. Accordingly, in this modified example, correct pitch information is obtained by performing pitch analysis on the first layer decoded signal.

Hence, according to this modified example, it is possible to enhance coding performance. Further, since the first layer decoded signal is also obtained on the decoding side, according to this modified example, it is not necessary to transmit information about the pitch period to the decoding side.

Figure 9:
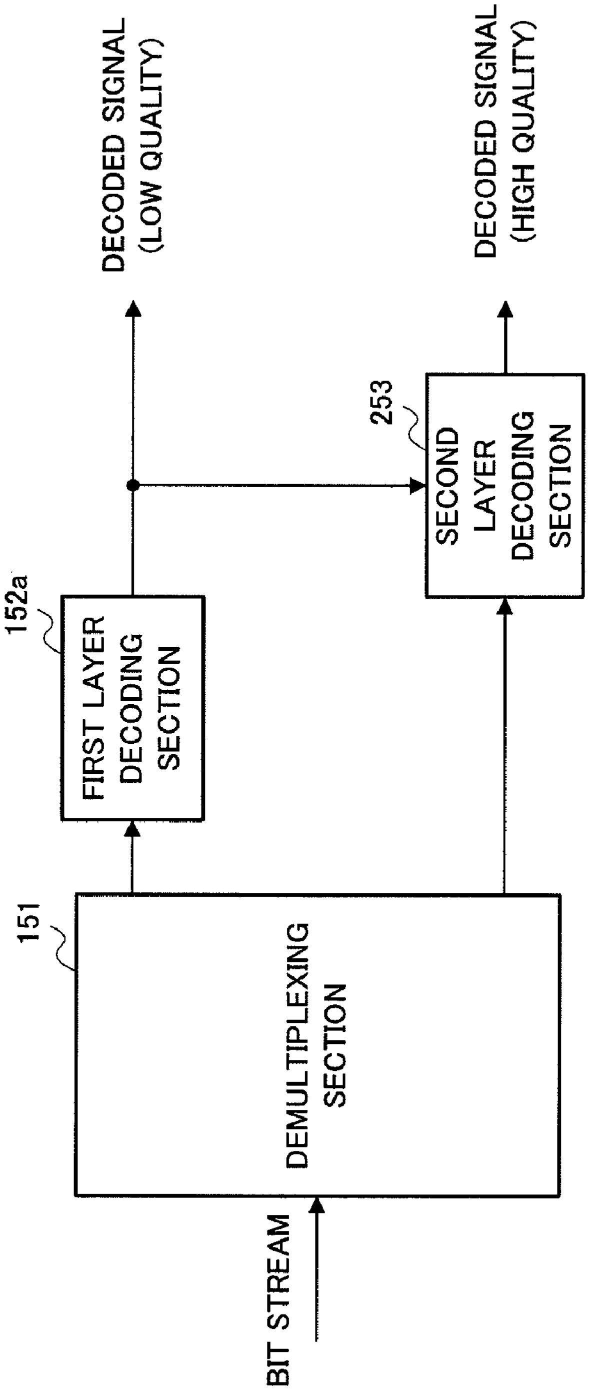
FIG. 9 is a block diagram showing a primary configuration of the scalable decoding apparatus according to Embodiment 1.
Figure 10:
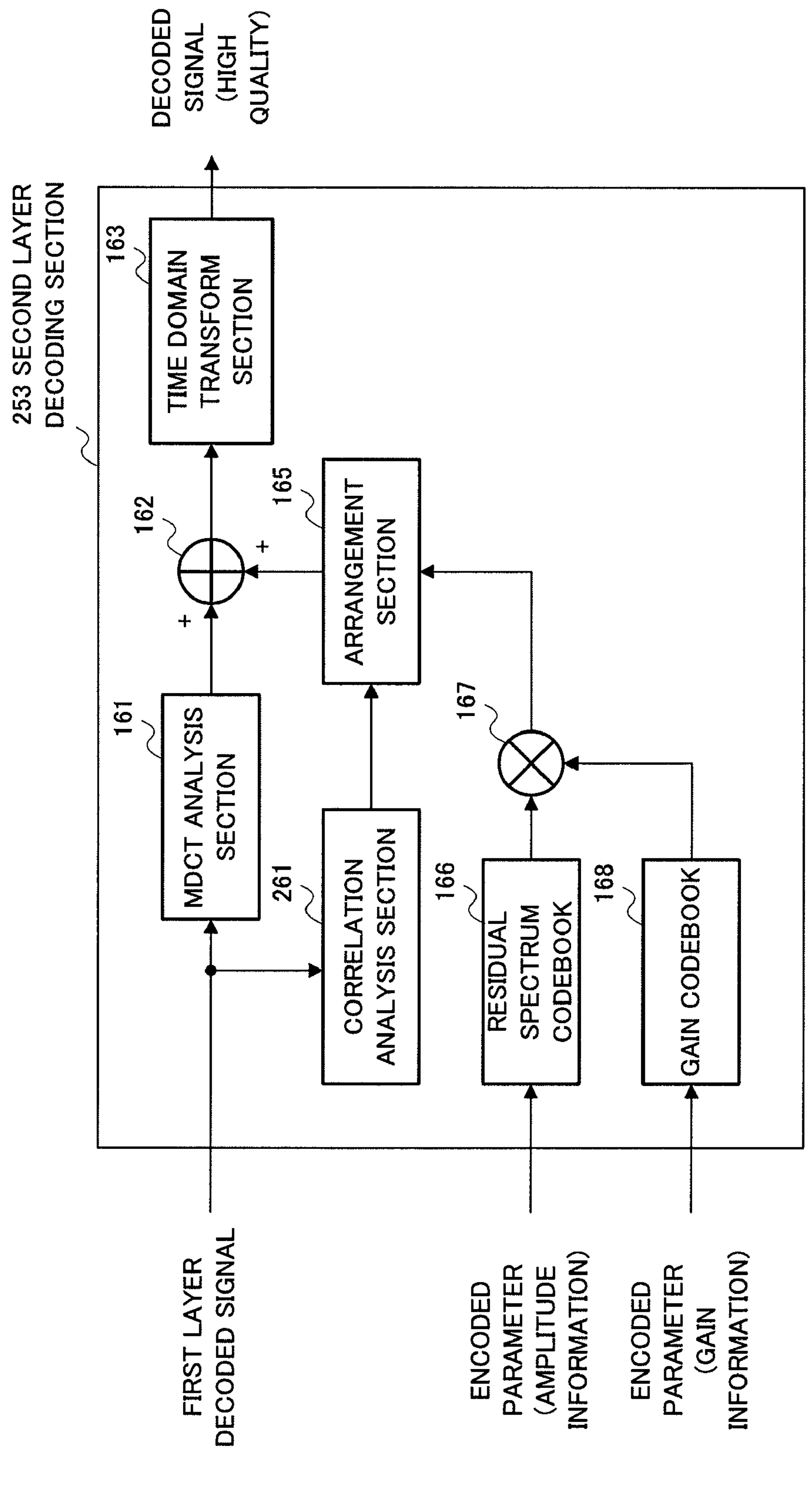
FIG. 10 is a block diagram showing a primary configuration inside the second layer decoding section according to Embodiment 1.

FIG. 9 is a block diagram showing a primary configuration of a scalable decoding apparatus corresponding to the scalable coding apparatus as shown in FIG. 7. Further, FIG. 10 is a block diagram showing a primary configuration inside second layer decoding section 253 inside the scalable decoding apparatus. Also herein, the same components as components described already are assigned the same reference numerals, and descriptions thereof are omitted.

Figure 11:
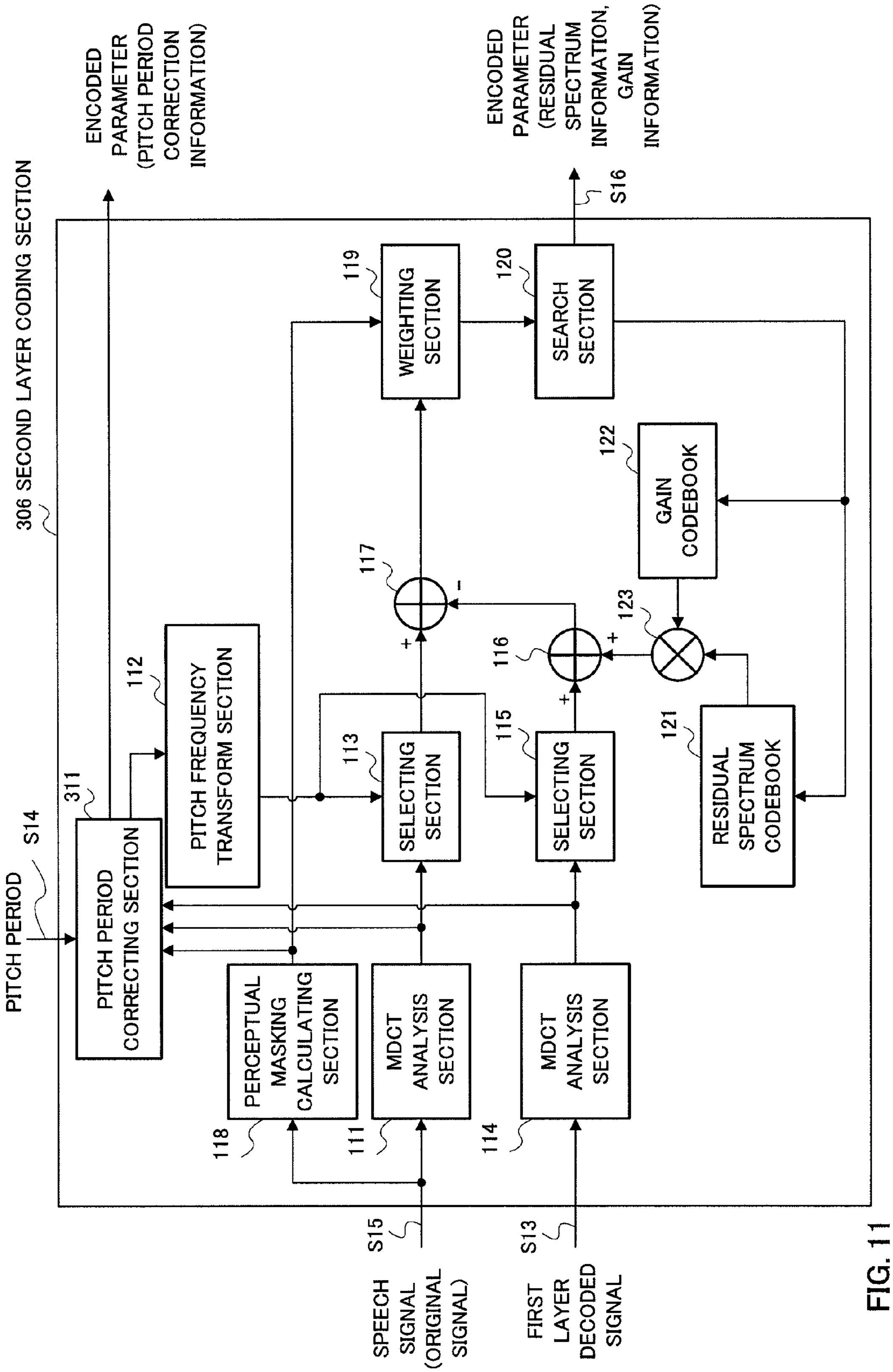
FIG. 11 is a block diagram showing a primary configuration of a modified example of the second layer coding section according to Embodiment 1.

FIG. 11 is a block diagram showing a primary configuration of modified example 2 of the scalable coding apparatus according to this embodiment, particularly, a modified example (second layer coding section 306) of second layer coding section 106. Also herein, the same components as components described already are assigned the same reference numerals, and descriptions thereof are omitted.

With reference to the pitch frequency obtained in the first layer, pitch period correcting section 311 recalculates a more correct pitch frequency from nearby pitch frequencies of the obtained pitch frequency, and encodes the difference. More specifically, pitch period correcting section 311 adds the difference ΔT to the pitch period T obtained in the first layer, transforms T+ΔT into a value of the second, and calculates the reciprocal of the value to obtain the pitch period. Pitch period correcting section 311 obtains d(k) of following equation 4 positioned at the harmonic frequencies specified by this pitch period or a total sum S of following d(k) contained in a frequency range limited by a harmonic frequency as a center. Herein, M(k) is an perceptual masking threshold, o(k) is a original signal spectrum, b(k) is a spectrum of a first layer decoded signal, MAX( ) is a function that returns a maximum value, and d(k) is a parameter indicating how much the amplitude of a residual spectrum exceeds the perceptual masking threshold resulting from comparison between the perceptual masking threshold (M(k)) and residual spectrum (o(k)−b(k)).
[4]

$$d(k)=\mathrm{Max}(|o(k)-b(k)|-M(k),0.0) \qquad \text{(Equation 4)}$$

This d(k) corresponds to the quantification of perceptual distortion. Pitch period correcting section 311 encodes ΔT when the total sum S is the maximum, outputs the result as pitch period correction information, and outputs T+ΔT to pitch frequency transform section 112.

Figure 12:
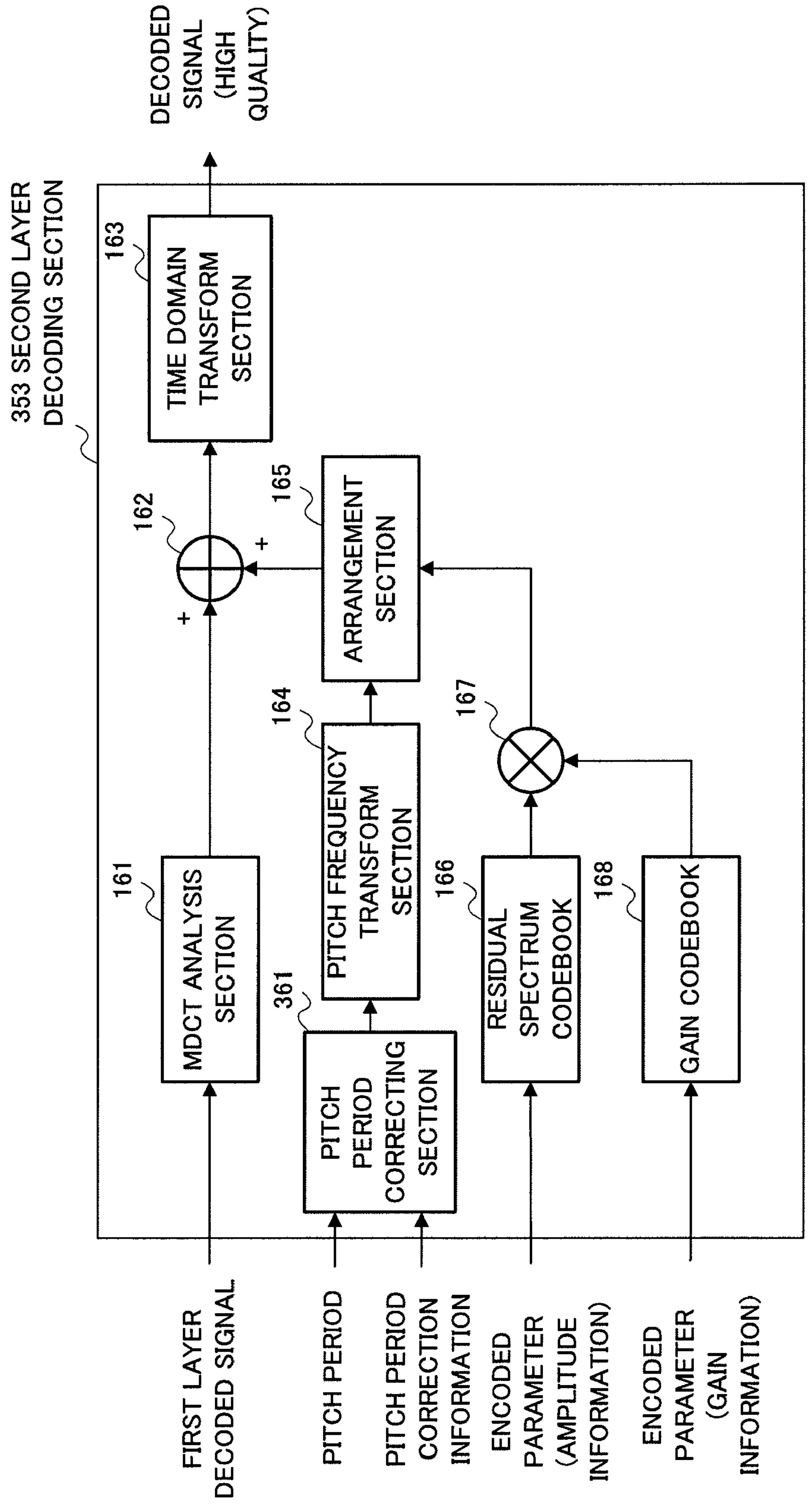
FIG. 12 is a block diagram showing a configuration of another second layer decoding section according to Embodiment 1.

FIG. 12 is a block diagram showing a configuration of second layer decoding section 353 corresponding to second layer coding section 306 as shown in FIG. 11. Pitch period correcting section 361 decodes the difference ΔT based on the pitch period correction information transmitted from second layer coding section 306, adds the pitch period T, and generates and outputs the corrected pitch period.

According to this configuration, by adding a small number of bits and obtaining a more correct pitch period, it is possible to improve the quality of the decoded signal.

Embodiment 2

In Embodiment 2 of the invention, from the relationship between the residual spectrum (obtained by subtracting the first layer decoded spectrum from the original signal spectrum) and perceptual masking threshold, the frequency (starting-point frequency) for determining the high-frequency spectra subject to coding in the second layer, is obtained, and the spectra at higher frequencies than the starting-point frequency are subjected to the harmonic spectrum coding explained in Embodiment 1. Then, the information about the starting-point frequency is encoded and transmitted to the decoding section.

Coding in the first layer employs the CELP scheme, and therefore has a characteristic of decreasing the coding distortion of components having high signal energy, and spectra having auditorily perceptible distortion tend to occur at high frequencies. Using this property, the number of spectra subject to coding is limited to improve coding efficiency.

Since the scalable coding apparatus according to this embodiment has the same basic configuration as that of the scalable coding apparatus described in Embodiment 1, descriptions of the entire figure are omitted, and second layer coding section 406 that is a configuration different from that in Embodiment 1 will be described below.

Figure 13:
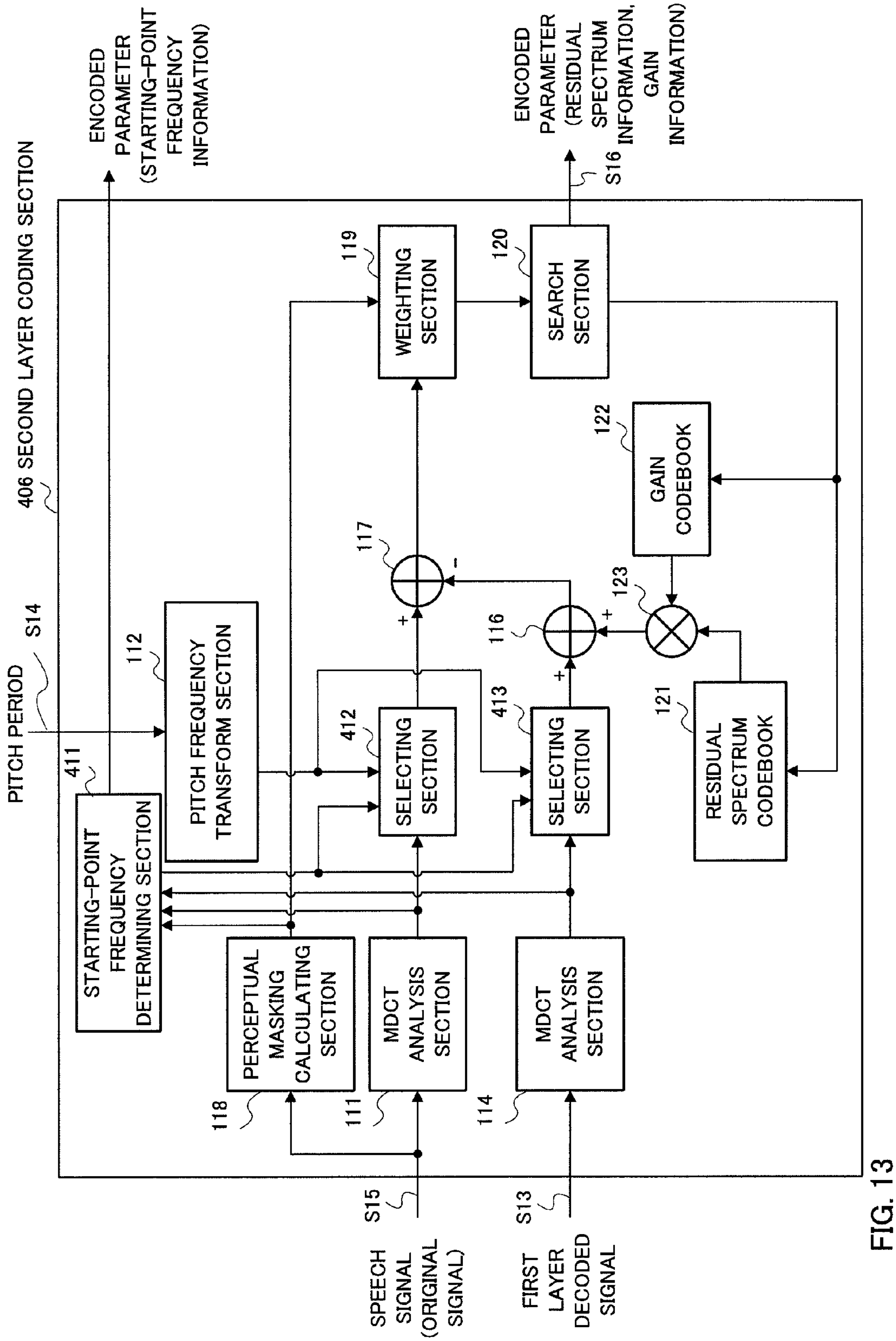
FIG. 13 is a block diagram showing a primary configuration of a second layer coding section according to Embodiment 2.

FIG. 13 is a block diagram showing a primary configuration of second layer coding section 406. In addition, the same components as those of second layer coding section 106 as described in Embodiment 1 are assigned the same reference numerals, and descriptions thereof are omitted.

Starting-point frequency determining section 411 determines the starting-point frequency from the relationship between the residual spectrum and perceptual masking threshold. Candidates for the starting-point frequency are determined beforehand, and the coding side and decoding side have the same table with candidates for the starting-point frequency and encoded parameters recorded therein.

For example, the starting-point frequency is determined by calculating d (k) expressed by the following equation and using this d(k).
[5]

$$d(k)=\mathrm{Max}(|o(k)-b(k)|-M(k),0.0) \qquad \text{(Equation 5)}$$

d(k) is a parameter indicating a degree by which the amplitude of the residual spectrum exceeds the perceptual masking threshold, and for example, a spectrum such that the amplitude of the residual spectrum does not exceed the perceptual masking threshold is regarded as zero.

Starting-point frequency determining section 411 calculates a total sum of d (k) of the harmonic frequencies or a limited range of harmonic frequencies as the center for each candidate for the starting-point frequency, selects a starting-point frequency when the variation amount of the total sum becomes larger, and outputs encoded parameters thereof.

Figure 14:
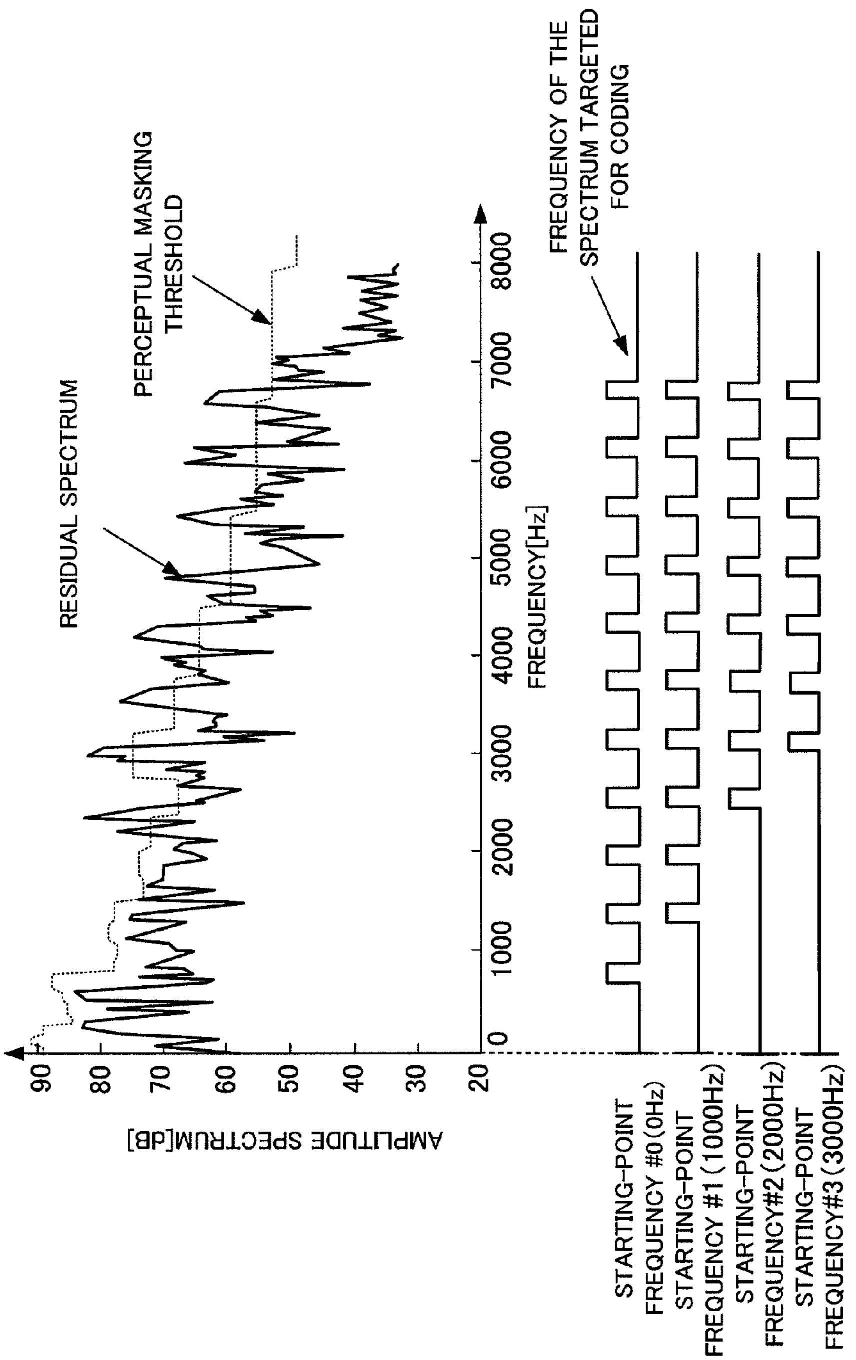
FIG. 14 is a diagram to explain the relationship between a residual spectrum and a starting-point frequency.

FIG. 14 is a diagram to explain the relationship between the residual spectrum and the starting-point frequency. The upper part shows the residual spectrum (solid line) and perceptual masking threshold (dotted line), and the lower part shows spectral frequencies (bands) subject to coding when the starting-point frequency varies from 0 Hz to 3000 Hz (i.e. at starting-point frequencies #0 to #3) (frequencies subject to coding and frequencies not subject to coding are shown by ON/OFF of the signals.)

The residual signal is obtained by regarding an audio signal with a sampling frequency of 16 kHz as an original signal and subtracting the first layer decoded signal from the original signal. In this example, the residual spectra with frequencies of 2000 Hz or less is below the perceptual masking threshold or less, and the residual spectra exceeding the perceptual masking threshold appear at positions of high frequencies of 2000 Hz or greater. In other words, the variation amount of the total sum of d(k) as described previously changes in a range between starting-point frequency #2 (2000 Hz) and starting-point frequency #3 (3000 Hz). Accordingly, in this case, encoded parameters indicative of starting-point frequency #2 are outputted as information specifying spectral frequencies subject to coding.

Figure 15:
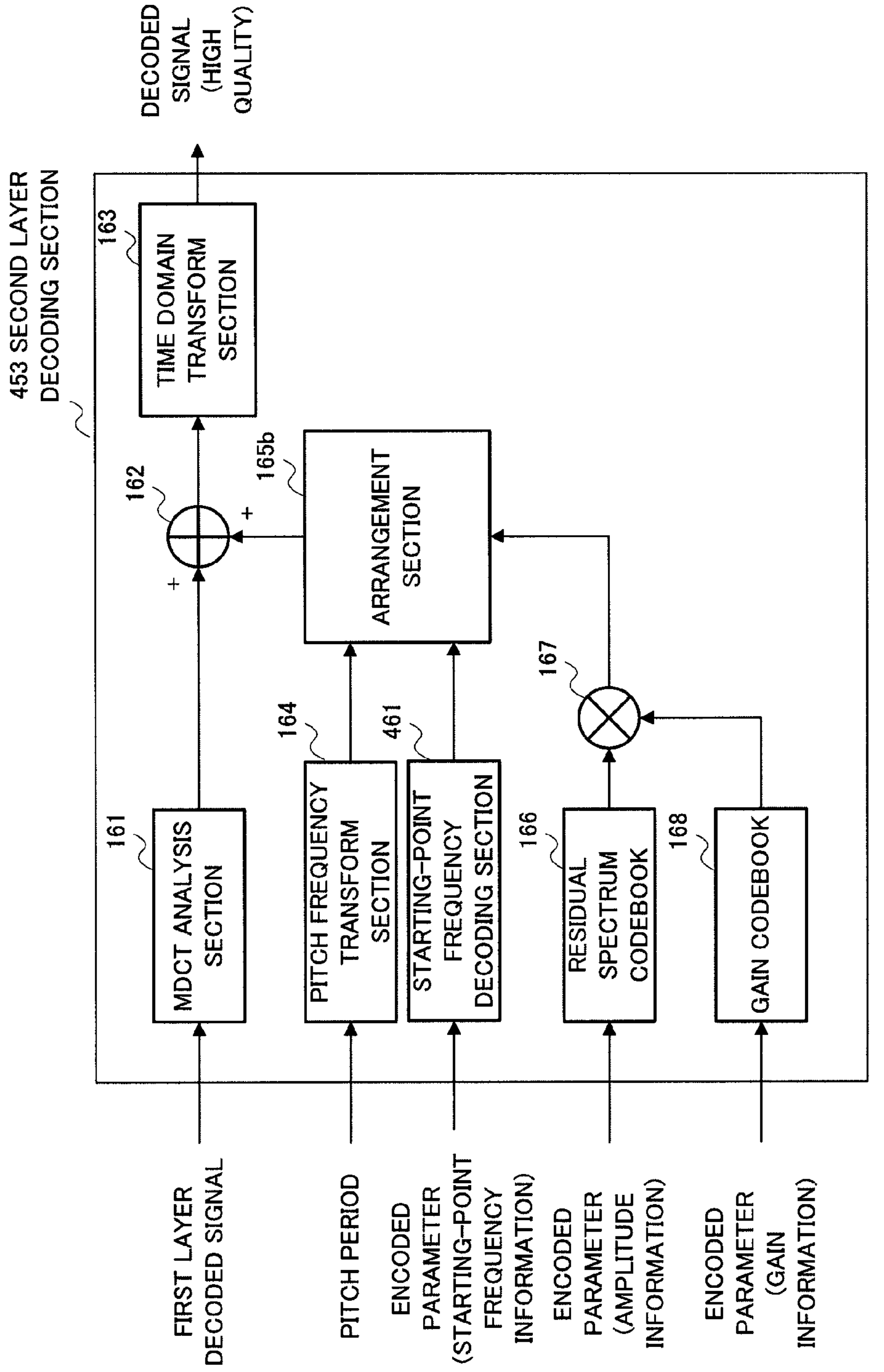
FIG. 15 is a block diagram showing a primary configuration of a second layer decoding section according to Embodiment 2.

FIG. 15 is a block diagram showing a primary configuration of second layer decoding section 453 corresponding to second layer coding section 406 as described above. The same components as those of second layer decoding section 153 (see FIG. 6) described in Embodiment 1 are assigned the same reference numerals, and descriptions thereof are omitted.

Using the encoded parameters of the starting-point frequency, starting-point frequency decoding section 461 decodes the starting-point frequency and outputs the result to arrangement section 165*b*. Using this starting-point frequency and the pitch frequency outputted from pitch frequency transform section 164, arrangement section 165*b* obtains a frequency to arrange the decoded residual spectrum, and arranges the decoded residual spectrum outputted from multiplier 167 at the obtained frequency.

According to this embodiment, the following effects are obtained. In other words, since coding of the first layer is CELP-scheme coding, the spectra of lower frequencies with high energy are encoded with relatively less coding distortion. Accordingly, by encoding only the harmonic spectra positioned at higher frequencies than the starting-point frequency in the second layer, the spectra subject to coding become fewer, and it is possible to decrease the bit rate of the encoded parameters. Therefore, although information about the starting-point frequency needs to be transmitted to the decoding side, it is still possible to implement a low bit rate of the encoded parameters.

Embodiment 3

In Embodiment 3, when a plurality of excitations exist and a plurality of pitch frequencies for specifying harmonic spectra exist, not one set, but a plurality of sets of harmonic spectra are encoded.

Figure 16:
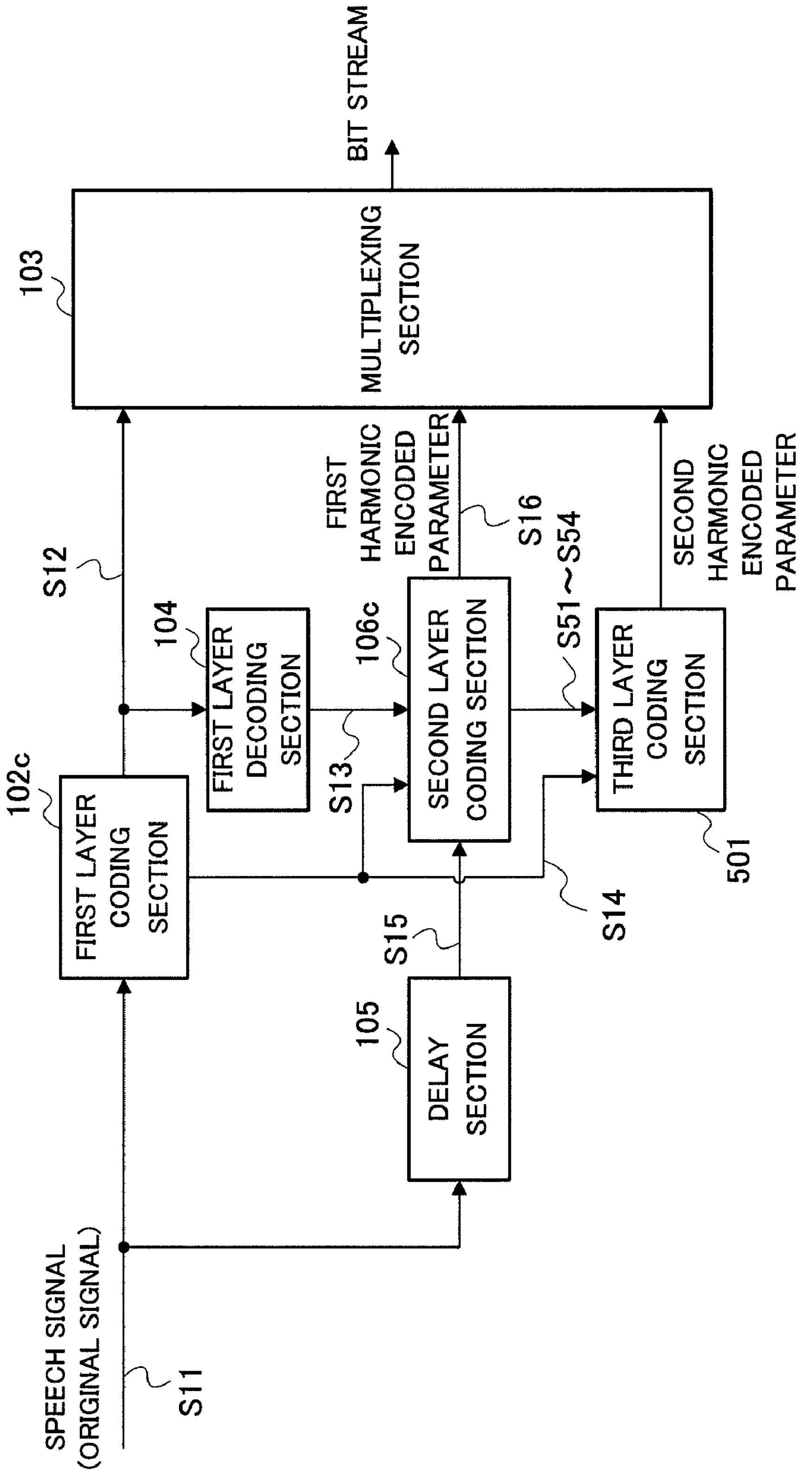
FIG. 16 is a block diagram showing a primary configuration of a scalable coding apparatus according to Embodiment 3.

FIG. 16 is a block diagram showing a primary configuration of a scalable coding apparatus according to Embodiment 3 of the invention. The scalable coding apparatus also has the same basic configuration as that of the scalable coding apparatus described in Embodiment 1, and the same components are assigned the same reference numerals to omit descriptions thereof.

The configuration of the scalable coding apparatus according to this embodiment has second layer coding section 106*c* that performs coding using the pitch period S14 obtained in first layer coding section 102*c*, and third coding layer coding section 501 that obtains a new pitch period for coding harmonic spectra from a nearby pitch period of the pitch period S14 as the reference and performs coding.

Second layer coding section 106*c* obtains the pitch frequency based on the pitch period S14 obtained in first layer coding section 102*c*, encodes a harmonic spectrum (first harmonic spectrum) specified by the pitch frequency, and outputs the obtained parameters (i.e. decoded first harmonic spectrum (S51)), perceptual masking threshold (S52), original signal spectrum (S53) and first layer decoded signal spectrum (S54), to third layer coding section 501.

With reference to the pitch period S14 obtained in first layer coding section 102*c*, third layer coding section 501 calculates the optimal pitch period from nearby pitch periods of the pitch period S14 (i.e. other pitch periods with values close to the pitch period S14) and encodes a harmonic spectrum (second harmonic spectrum) specified from the calculated pitch period.

Further, as in Embodiment 1 and modified example 2, third layer coding section 501 also encodes the difference between the calculated pitch period and pitch period S14. As the calculation method for the newly calculated pitch period, the same method as in Embodiment 1 and modified example 2 is used.

Figure 17:
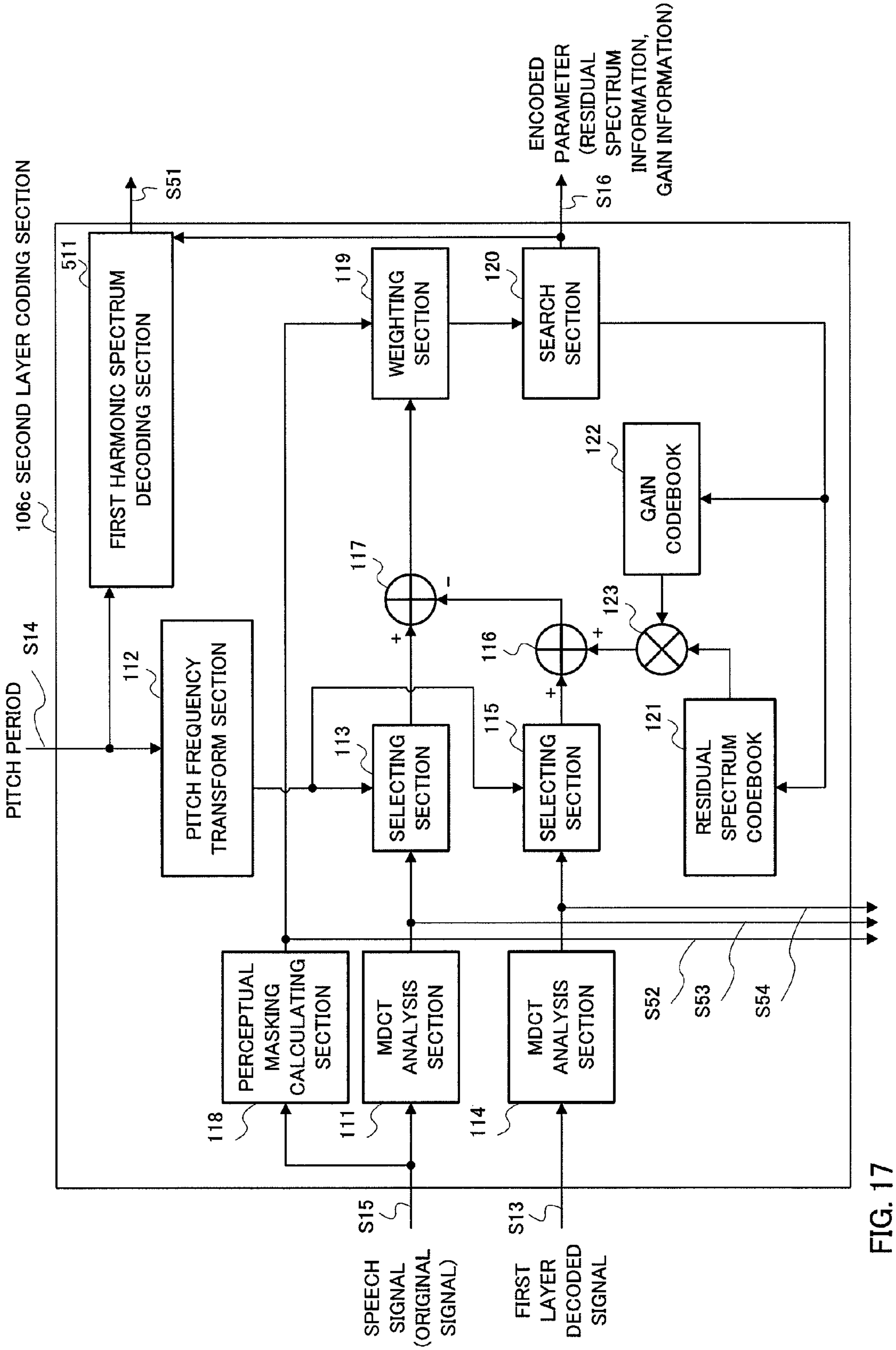
FIG. 17 is a block diagram showing a primary configuration inside a second layer coding section according to Embodiment 3.
Figure 18:
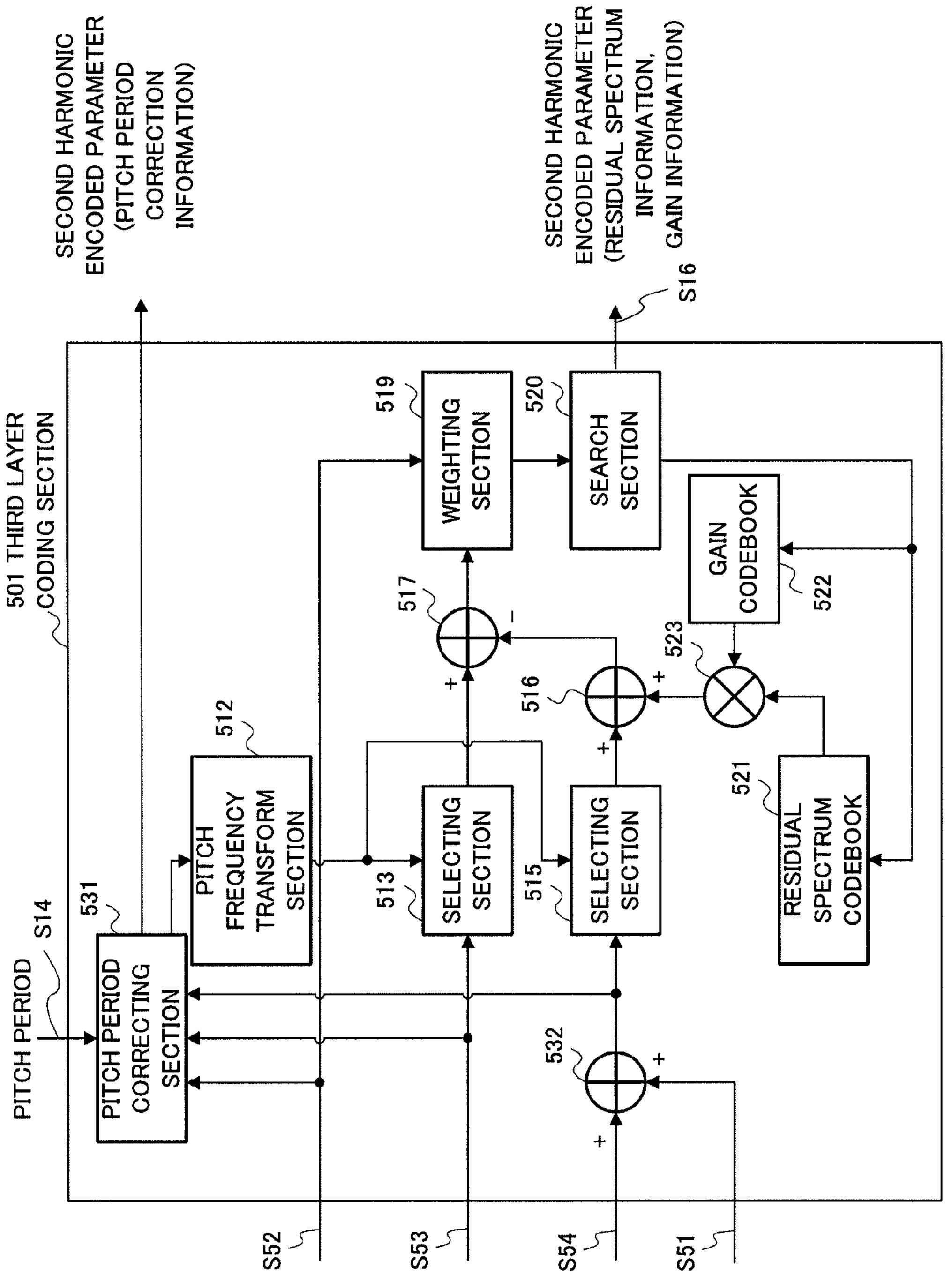
FIG. 18 is a block diagram showing a primary configuration inside a third layer coding section according to Embodiment 3.

FIG. 17 is a block diagram showing a primary configuration inside second layer coding section 106*c* as described above. Further, FIG. 18 is a block diagram showing a primary configuration inside third layer coding section 501 as described above.

First harmonic spectrum decoding section 511 inside second layer coding section 106*c* decodes the first harmonic spectrum from the pitch frequency obtained from the pitch period S14 and the encoded parameters (first harmonic encoded parameters) obtained by encoding the first harmonic spectrum, and sends it to third layer coding section 510 (S51).

Third layer coding section 501 adds the first harmonic spectrum (S51) to the first layer decoded spectrum (S54), and, using the result, determines encoded parameters (second harmonic encoded parameters) of the second harmonic spectrum by search.

Figure 19:
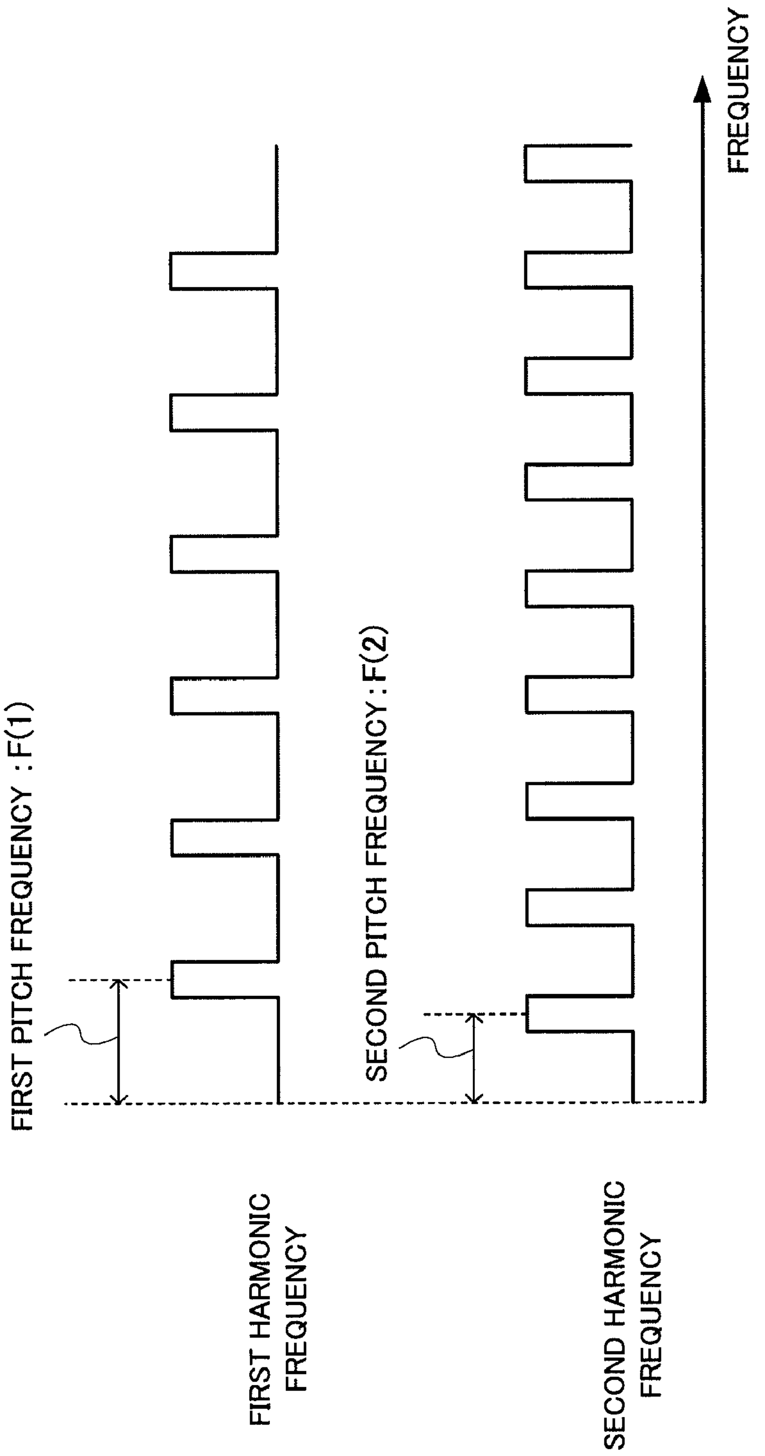
FIG. 19 is a diagram conceptually showing a first harmonic frequency and a second harmonic frequency.

FIG. 19 is a diagram conceptually showing the first harmonic frequency subject to coding in second layer coding section 106*c* and the second harmonic frequency subject to coding in third layer coding section 501. Herein, the frequencies subject to coding and the frequencies not subject to coding are indicated by ON/OFF of the signals.

Thus, according to this embodiment, for an input signal having two different harmonic spectra, it is possible to encode each of the harmonic spectra with high efficiency. Further, by applying this technique, for example, when there are a plurality of speakers and/or musical instruments, it is possible to perform high quality coding on a signal having a plurality of harmonic spectra with different harmonic frequencies. Accordingly, it is possible to improve subjective quality. According to this configuration, since the difference from the reference pitch period is encoded, it is possible to make the encoded parameters low bit rate.

In addition, as shown in modified example 1 of Embodiment 1, second layer coding section 106*c* may substitute a pitch period obtained by analyzing the first layer decoded signal S13 for the pitch period S14.

Figure 20:
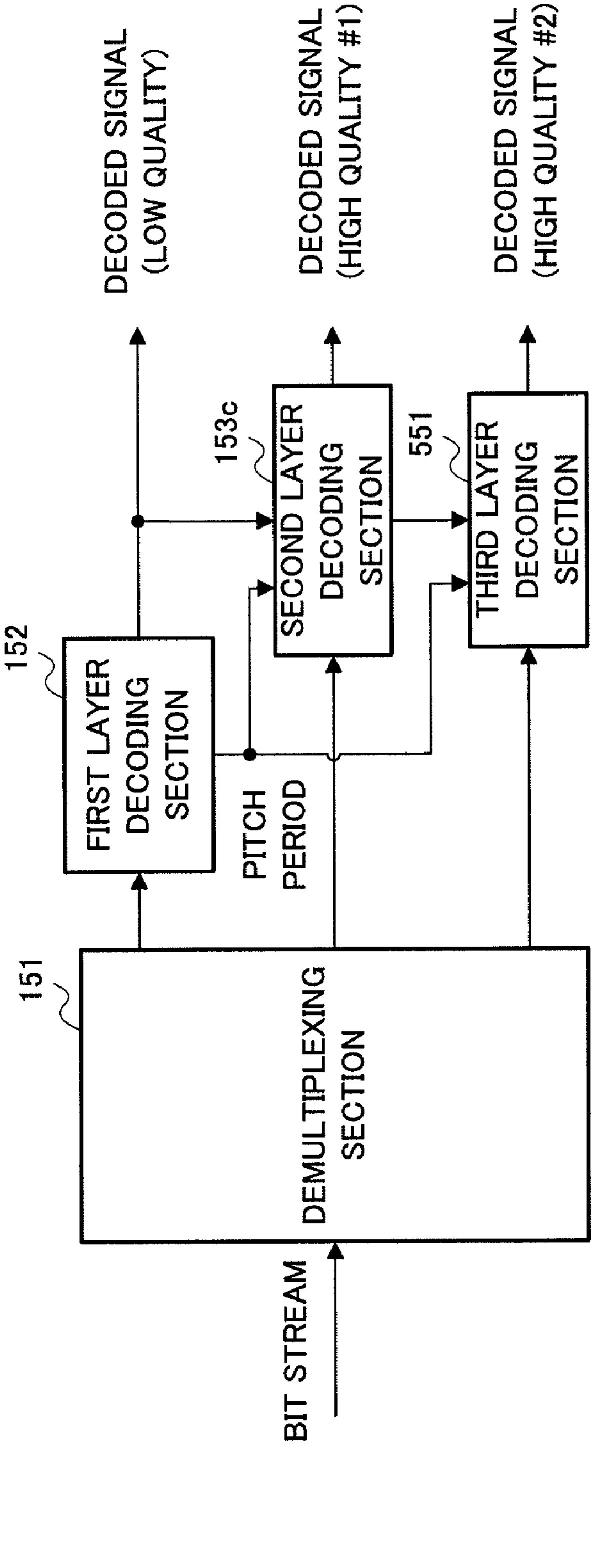
FIG. 20 is a block diagram showing a primary configuration of a scalable decoding apparatus according to Embodiment 3.

FIG. 20 is a block diagram showing a primary configuration of a scalable decoding apparatus corresponding to the scalable coding apparatus according to this embodiment as described above. The same components as those in the scalable decoding apparatus described in Embodiment 1 are assigned the same reference numerals, and descriptions thereof are omitted.

Second layer decoding section 153*c* performs decoding processing using the first layer encoded parameters and information up to the first harmonic encoded parameters, and outputs a high-quality decoded signal #1. Third layer decoding section 551 performs decoding processing using the first layer encoded parameters, the first harmonic encoded parameters, and information about the second harmonic encoded parameters, and outputs a high-quality decoded signal #2 higher than that of the high-quality decoded signal #1.

Figure 21:
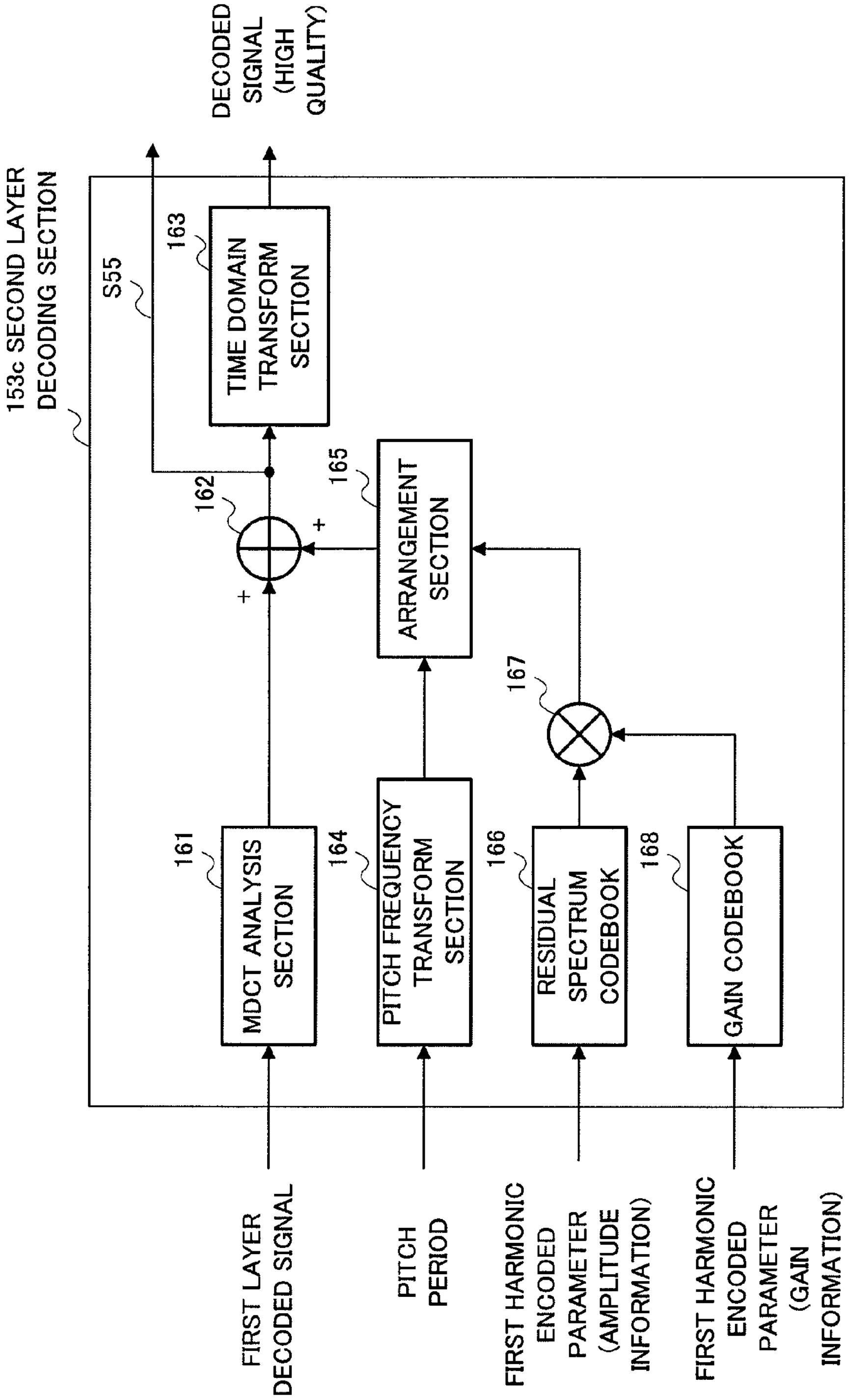
FIG. 21 is a block diagram showing a primary configuration inside a second layer decoding section according to Embodiment 3.
Figure 22:
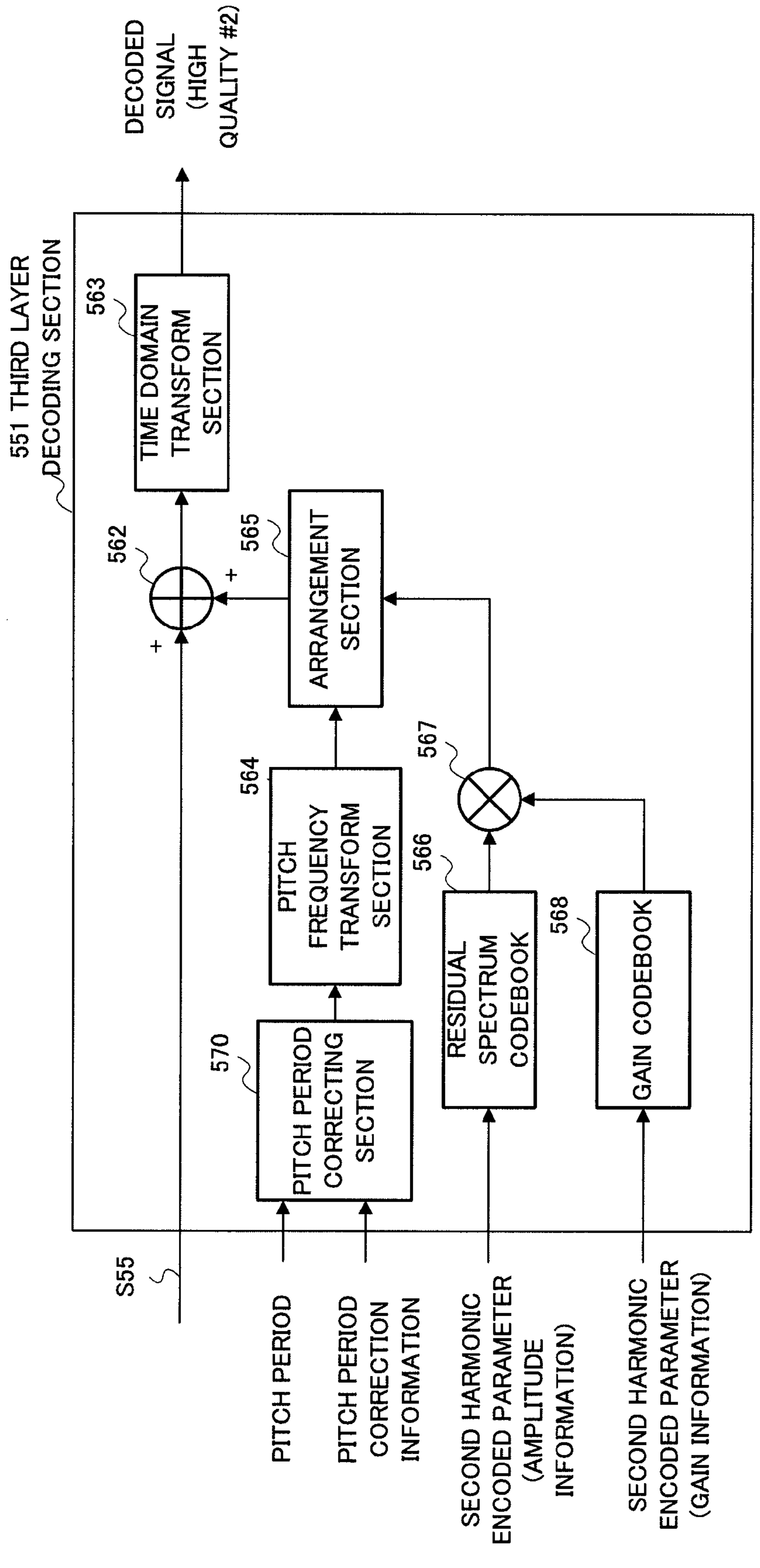
FIG. 22 is a block diagram showing a primary configuration inside a third layer decoding section according to Embodiment 3.

FIG. 21 is a block diagram showing a primary configuration inside second layer decoding section 153*c* as described above. Further, FIG. 22 is a block diagram showing a primary configuration inside third layer decoding section 551 as described above.

Second layer decoding section 153*c* decodes the first harmonic spectrum from the pitch period and the first harmonic encoded parameters, and outputs an addition result of the first harmonic spectrum and the first layer decoded spectrum to third layer decoding section 551. Third layer decoding section 551 adds the decoded second harmonic spectrum to the spectrum (S55) obtained by adding the first layer decoded spectrum and the decoded first harmonic spectrum.

According to this configuration, by using part or all of encoded parameters, it is possible to generate three types of quality of decoded signals—namely, low-quality decoded signal, high-quality decoded signal #1 and high-quality decoded signal #2. This means that scalable functions can be controlled more finely.

Each of the embodiments of the invention is described in the forgoing.

The scalable coding apparatus, scalable decoding apparatus and method for the apparatuses according to the invention are not limited to each of the above-mentioned embodiments, and are capable of being carried into practice with various modified examples thereof. For example, each of the embodiments is capable of being carried into practice in a combination thereof as appropriate.

The scalable coding apparatus and scalable decoding apparatus according to the invention are capable of being installed in a communication terminal apparatus and base station apparatus in a mobile communication system, and by this means, it is possible to provide the communication terminal apparatus and base station apparatus having the same action and effects as described above.

In addition, in each of the above-mentioned embodiments, the explanation is given using the case as an example where the number of layers is two or three in scalable coding, but the invention is not limited thereto and is applicable to scalable coding with four layers or more.

Further, in each of the above-mentioned embodiments, the explanation is given using the case as an example where CELP-scheme coding is performed in the first layer coding section, but the invention is not limited thereto, and the coding method in the first layer coding section needs only to use the pitch period of a speech signal.

Furthermore, the invention is applicable to a case where the sampling rate varies between signals processed by individual layers. For example, when the sampling rate of a signal processed by the nth layer is represented by Fs(n), the relationship of $Fs(n) \leqq Fs(n+1)$ holds.

Still furthermore, in each of the above-mentioned embodiments, the explanation is given using the case as an example where MDCT is used as a scheme of transform coding in the second layer, but the invention is not limited thereto. Such a scheme may be another transform coding scheme such as DFT (Discrete Fourier Transform), cosine transform, Wavelet transform and the like.

Moreover, in determining a nearby pitch period of the pitch period (T1) obtained in the first layer as the reference, pitch periods including at least one of an integral multiple of T1 and an integral submultiple of T1, may be added to the reference in determining the pitch period. This is of measures against half pith and/or double pitch.

In addition, described herein is the case where the invention is constructed by hardware as an example, but the invention is capable of being implemented by software.

Each function block employed in the description of each of the aforementioned embodiments may typically be implemented as an LSI constituted by an integrated circuit. These may be individual chips or partially or totally contained on one chip.

"LSI" is adopted here but this may also be referred to as "IC", "system LSI", "super LSI", or "ultra LSI" depending on differing extents of integration.

Further, the method of circuit integration is not limited to LSI's, and implementation using dedicated circuitry or general purpose processors is also possible.

After LSI manufacture, utilization of an FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application in biotechnology is also possible.

The present application is based on Japanese Patent Application No. 2004-314230 filed on Oct. 28, 2004, the entire content of which is expressly incorporated by reference herein.

INDUSTRIAL APPLICABILITY

The scalable coding apparatus, scalable decoding apparatus and method for these apparatuses according to the invention are applicable for use with communication terminal apparatus, base station apparatus, etc. in a mobile communication system.

The invention claimed is:

1. A scalable coding apparatus, comprising:

a first layer coder that generates first encoded parameters by encoding a speech signal using a pitch period of the speech signal;

a calculator that calculates a pitch frequency from the pitch period;

a decoder that generates a decoded signal using the first encoded parameters;

a second layer coder that generates second encoded parameters; and a selector that selects integral multiples of the pitch frequency from both a spectrum of the speech signal and a spectrum of the decoded signal, wherein the second layer coder generates the second encoded parameters by encoding a residual spectrum obtained by subtracting the spectrum of the decoded signal from the spectrum of the speech signal, the residual spectrum being limited to the selected integral multiples of the pitch frequency higher than a predetermined starting-point frequency.

2. The scalable coding apparatus according to claim 1, further comprising a third layer coder that, when the spectra of the speech signal comprise a plurality of pitch frequencies, using another pitch frequency that is different from the pitch frequency used in the second layer coder, encodes a spectrum at a frequency of an integral multiple of said another pitch frequency.

3. The scalable coding apparatus according to claim 2, wherein the third layer coder further encodes a difference between said another pitch frequency and the pitch frequency used in the second layer coder.

4. The scalable coding apparatus according to claim 1, wherein the calculator acquires the pitch period from the decoded signal of an encoded parameter obtained in the first coder and calculates the pitch frequency.

5. The scalable coding apparatus according to claim 1, further comprising a starting-point frequency determinier that determines the starting-point frequency from a relationship between the residual spectrum and a perceptual masking threshold.

6. The scalable coding apparatus according to claim 5, wherein the second layer coder further encodes information related to the determined starting-point frequency.

7. The scalable coding apparatus according to claim 1, further comprising a corrector that corrects the pitch period based on a nearby pitch period of the pitch period, wherein the calculator calculates the pitch frequency from the corrected pitch period.

8. The scalable coding apparatus according to claim 7, wherein the second layer coder further encodes a difference between the pitch period and the corrected pitch period.

9. The scalable coding apparatus according to claim 1, wherein the second layer coder performs encoding using a modified discrete cosine transform.

10. . The scalable coding apparatus according to claim 1, wherein said residual spectrum encoded by the second layer coder is limited to a predetermined bandwidth around each of the integral multiples of the pitch frequency selected by the selector.

11. A scalable decoding apparatus, comprising:

a first layer decoder that generates a low-quality decoded signal by decoding first encoded parameters of a speech signal that have been encoded using a pitch period of the speech signal;

a calculator that calculates a pitch frequency from the pitch period;

a second layer decoder that generates a high-quality decoded signal by adding an arranged residual spectrum obtained by decoding second encoded parameters to a spectrum of the low-quality signal; and an arranger that generates the arranged residual spectrum by arranging a residual spectrum, that represents a difference between the spectrum of the low quality decoded signal and a spectrum of the speech signal, the residual spectrum being obtained by decoding the second encoded parameters into harmonic spectra positioned at frequencies of integral multiples of the calculated pitch frequency calculated by the calculator and higher than a predetermined starting-point frequency.

12. A communication terminal apparatus comprising the scalable coding apparatus according to claim 1.

13. A communication terminal apparatus comprising the scalable decoding apparatus according to claim 11.

14. A base station apparatus comprising the scalable coding apparatus according to claim 1.

15. A base station apparatus comprising the scalable decoding apparatus according to claim 11.

16. A scalable coding method, comprising:

generating first encoded parameters by encoding a speech signal, utilized by a communication system, using a pitch period of the speech signal;

calculating a pitch frequency from the pitch period;

generating a decoded signal using the first encoded parameters;

generating second encoded parameters; and selecting integral multiples of the pitch frequency from both a spectrum of the speech signal and a spectrum of the decoded signal, wherein the second encoded parameters are generated by encoding a residual spectrum obtained by subtracting the spectrum of the decoded signal from the spectrum of the speech signal, the residual spectrum being limited to the selected integral multiples of the pitch frequency higher than a predetermined starting-point frequency.

17. A scalable decoding method, comprising:

generating a low-quality decoded signal, utilized by a communication system, by decoding first encoded parameters of a speech signal that have been encoded using a pitch period of the speech signal;

calculating a pitch frequency from the pitch period;

generating a high-quality decoded signal by adding an arranged residual spectrum obtained by decoding second encoded parameters to a spectrum of the low-quality signal; and generating the arranged residual spectrum by arranging a residual spectrum, representing a difference between the spectrum of the low quality signal and a spectrum of the speech signal, the residual spectrum being obtained by decoding the second encoded parameters into harmonic spectra positioned at frequencies of integral multiples of the calculated pitch frequency and higher than a predetermined starting-point frequency.

18. A scalable coding apparatus, comprising:

a first coder that encodes a speech signal using a pitch period of the speech signal;

a calculator that calculates a pitch frequency from the pitch period;

a second coder that encodes a spectrum of a frequency of an integral multiple of the pitch frequency in spectra of the speech signal; and a corrector that corrects the pitch period based on a nearby pitch period of the pitch period, wherein the calculator calculates the pitch frequency from the corrected pitch period, and the second coder further encodes a difference between the pitch period and the corrected pitch period.

19. A scalable coding method, comprising:

encoding a speech signal, utilized by a communication system, using a pitch period of the speech signal;

calculating a pitch frequency from the pitch period;

encoding a spectrum of a frequency of an integral multiple of the pitch frequency in spectra of the speech signal;

correcting the pitch period based on a nearby pitch period of the pitch period; and encoding a difference between the pitch period and the corrected pitch period, wherein calculating a pitch frequency calculates the pitch frequency from the corrected pitch period.

* * * * *

UNITED STATES PATENT AND TRADEMARK OFFICE

CERTIFICATE OF CORRECTION

PATENT NO. : 8,019,597 B2
APPLICATION NO. : 11/577816
DATED : September 13, 2011
INVENTOR(S) : Masahiro Oshikiri It is certified that error appears in the above-identified patent and that said Letters Patent is hereby corrected as shown below:

On Title Page, please add:

Item (30) Foreign Application Priority Data

Oct. 28, 2004 (JP) ............................ 2004-314230

Signed and Sealed this
Fifteenth Day of May, 2012

David J. Kappos
*Director of the United States Patent and Trademark Office*